United States Patent
Yoshida

(10) Patent No.: US 8,838,879 B2
(45) Date of Patent: Sep. 16, 2014

(54) MEMORY SYSTEM

(75) Inventor: Norikazu Yoshida, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 181 days.

(21) Appl. No.: 13/238,191

(22) Filed: Sep. 21, 2011

(65) Prior Publication Data

US 2012/0079172 A1  Mar. 29, 2012

(30) Foreign Application Priority Data

Sep. 24, 2010  (JP) ................. 2010-213776

(51) Int. Cl.
*G06F 13/00* (2006.01)
*G06F 13/28* (2006.01)
*G06F 12/06* (2006.01)

(52) U.S. Cl.
CPC ...... *G06F 12/0607* (2013.01); *G06F 2212/202* (2013.01)
USPC .................. 711/103; 711/154; 711/E12.002; 710/52

(58) Field of Classification Search
USPC ....................... 711/103, 154, E12.002; 710/52
See application file for complete search history.

(56) References Cited

U.S. PATENT DOCUMENTS

| | | | |
|---|---|---|---|
| 2008/0016267 A1 | 1/2008 | Oyaizu | |
| 2008/0229079 A1* | 9/2008 | Flynn et al. | 712/220 |
| 2009/0089490 A1* | 4/2009 | Ozawa et al. | 711/103 |
| 2009/0125785 A1* | 5/2009 | Gorobets et al. | 714/763 |
| 2009/0265508 A1* | 10/2009 | Bennett et al. | 711/103 |
| 2011/0093647 A1* | 4/2011 | Lai et al. | 711/103 |
| 2012/0246380 A1* | 9/2012 | Akerib et al. | 711/5 |

* cited by examiner

*Primary Examiner* — Edward Dudek, Jr.
(74) *Attorney, Agent, or Firm* — Oblon, Spivak, McClelland, Maier & Neustadt, L.L.P.

(57) ABSTRACT

Created is transfer order information indicating an order of transfer from multiple memory areas in accordance with an order of logical addresses and memory locations which are specified by read commands. Readout from the multiple memory areas in accordance with the transfer order information is performed by controlling memory controllers in accordance with the created transfer order information.

20 Claims, 18 Drawing Sheets

MEMORY SYSTEM

CROSS-REFERENCE TO RELATED APPLICATIONS

This application is based upon and claims the benefit of priority from prior Japanese Patent Application No. 2010-213776, filed Sep. 24, 2010, the entire contents of which are incorporated herein by reference.

FIELD

The present invention relates to a memory system including a plurality of nonvolatile memories and a controller.

BACKGROUND

A solid state drive (SSD) on which a nonvolatile semiconductor memory, such as a NAND flash memory (hereinafter referred to as a "NAND memory"), is mounted has drawn attention as a memory system used for a computer system. The SSD is advantageous in terms of fast operation, light weight and the like, compared to a magnetic disk device.

DETAILED DESCRIPTION OF THE EXEMPLARY EMBODIMENTS

According to one embodiment, a memory system comprising: a plurality of nonvolatile semiconductor memories connected to a common data input/output line, and capable of performing a bank interleaving operation among the nonvolatile semiconductor memories, each of the nonvolatile semiconductor memories performing data reading per page unit; a first controller configured to generate a plurality of page read commands by expanding a read request per page unit, and to allocate each of the plurality of page read commands to a corresponding one of read queues provided respectively for the plurality of nonvolatile semiconductor memories in accordance with addresses specified by the page read commands; a second controller configured to receive the page read commands outputted from the first controller, and to issue the page read commands to the nonvolatile semiconductor memories corresponding to the respective read queues, as well as to transfer data pieces read from the nonvolatile semiconductor memories; and a third controller configured to control the second controller in order that an order in which the data pieces read from the nonvolatile semiconductor memories are transferred coincides with an order of logical addresses specified by the read request.

Bank interleaving has been adopted to improve transfer efficiency in recent years. In the bank interleaving, a NAND memory mounted on an SSD is segmented into multiple memory areas (banks) to which data can be read and written simultaneously in parallel, and banks to which the data pieces are to be written are switched when the data is continuously written to the NAND memory. In the case of the data write operation, the bank interleaving is easier to perform efficiently. This is because the time required to write data to the NAND memory is longer than the time required to read data from the NAND memory, and memory addresses for the write operation are basically arbitrary in the NAND memory. In the case of the read operation, however, the bank switching is hard to perform efficiently, unlike in the case of the write operation. This is because the time required to read data is short and read data pieces need to be outputted in an order of the logical addresses which are specified by a read command inputted from a host.

Detailed descriptions will be hereinbelow provided for a memory system of each embodiment of the invention by referring to the attached drawings. It should be noted that the invention is not limited by any embodiment.

First Embodiment

Figure 1:
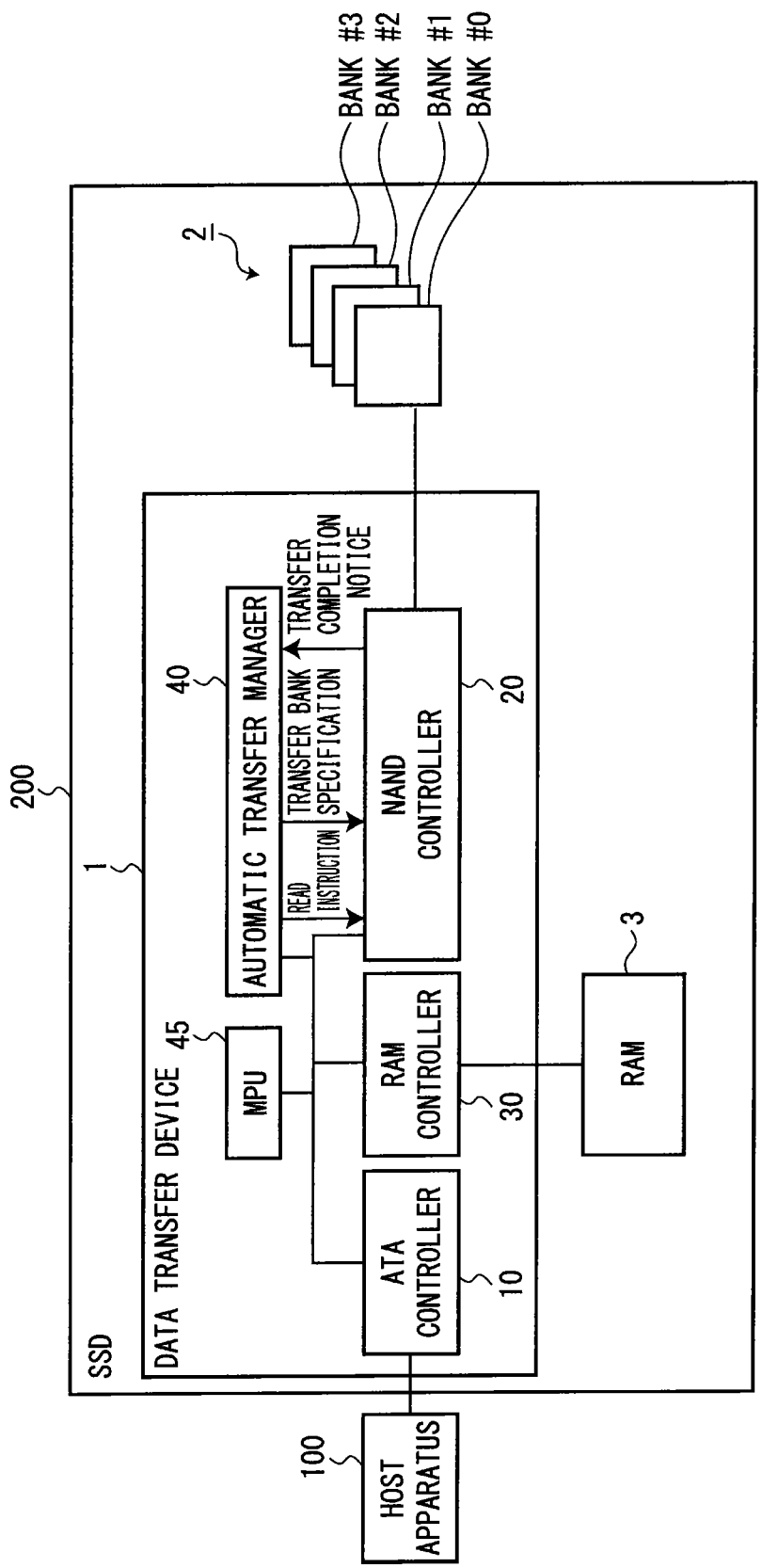
FIG. 1 is a block diagram showing an example of a configuration of a SSD.

FIG. 1 is a block diagram showing a configuration of a memory system of an embodiment of the invention. Descriptions will be provided by using a SSD as an example of the memory system. However, the application of the embodiment is not limited to the SSD.

A SSD 200 is connected to a host apparatus (hereinafter referred to as a "host" as well) 100, such as a personal computer, through a communication interface with the ATA (Advanced Technology Attachment) standards, and functions as an external storage of the host 100. The SSD 200 includes: a NAND memory 2 which is a nonvolatile semiconductor memory chip for storing data to be read/written by the host 100; a data transfer device 1 for controlling the transfer of data to and from the SSD 200; and a RAM 3 which is, for example, a volatile memory chip, and which is used by the data transfer device 1 to do things such as primarily store the transferred data when transferring data.

Date transmitted from the host 100 is temporarily stored in the RAM 3 under the control of the data transfer device 1. Thereafter, the data is read from the RAM 3, and is written to the NAND memory 2. On the other hand, data read from the NAND memory 2 is temporarily stored in the RAM 3. Thereafter, the data is read from the RAM 3, and is transferred to the host apparatus 100. The RAM 3 may be provided inside the data transfer device 1. As the RAM 3, a Dynamic Random Access Memory (DRAM), a Static Random Access Memory (SRAM) or the like may be used, for example.

The data transfer device 1 includes: processors such as an ATA interface controller (ATA controller) 10, an RAM controller 30, a NAND controller 20 and a Micro Processing Unit (MPU) 45; and an automatic transfer manager 40. The ATA controller 10 controls the ATA interface, and the transfer of data between the host apparatus 100 and the RAM 3. The RAM controller 30 controls the reading/writing of data from and to the RAM 3. The NAND controller 20 controls the transfer of data between the NAND memory 2 and the RAM 3. The MPU 45 controls the entire data transfer device 1 on the basis of firmware. The automatic transfer manager 40 performs read management for the reading from the NAND memory 2, and data transfer management when data read from the NAND memory 2 is transferred to the RAM 3. The MPU 45, the ATA controller 10, the RAM controller 30, the NAND controller 20, and the automatic transfer manager 40 are connected together through a bus. The automatic transfer manager 40 is a host control module for the NAND controller 20. Under the control of the MPU 45, the automatic transfer manager 40 manages the NAND controller 20's control of the reading from the NAND memory 2. Read instructions and transfer bank specifications are outputted from the automatic transfer manager 40 to the NAND controller 20 via respective dedicated signal lines, as described later. On the other hand, transfer completion notices are outputted from the NAND controller 20 to the automatic transfer manager 40, as described later.

The NAND memory 2 stores user data which is specified by the host 100, and stores management information, which is managed by the RAM 20, for a backup purpose. The NAND memory 2 has memory cell arrays in each of which multiple memory cells are arrayed in a matrix. Each memory cell is capable of multi-valued storing by use of a higher-order page and a lower-order page. The NAND memory 2 includes multiple memory chips. Each memory chip is formed by arranging multiple physical blocks each being a unit of a data erasure. In addition, data is written to and read from the NAND memory 2 on a physical page basis. Each physical block includes multiple physical pages.

The NAND memory 2 includes multiple banks (4 banks, or a bank #0 to a bank #3, in FIG. 2) to which bank interleaving can be applied. The banks #0 to #3 are each formed of the multiple memory chips, for example.

The RAM 3 is used as storage for the data transfer, as storage for recording the management information, or as working storage. To put it specifically, the RAM 3 used as the storage for the date transfer (a buffer for the data transfer) temporarily stores data on which a write request is issued from the host 100, before the data is written to the NAND memory 2; and temporarily stores data on which a read request is issued from the host 100, after the data is read from the NAND memory 2. Furthermore, the RAM 3 used as the storage for recording the management information is used to store management information (a variety of management tables stored in the NAND memory 2 which are expanded at an activation time; and a log which is information on difference in change of each management table) used to manage the association between storage locations of data to be stored in the NAND memory 2 and logical addresses to be specified by the host.

Figure 2:
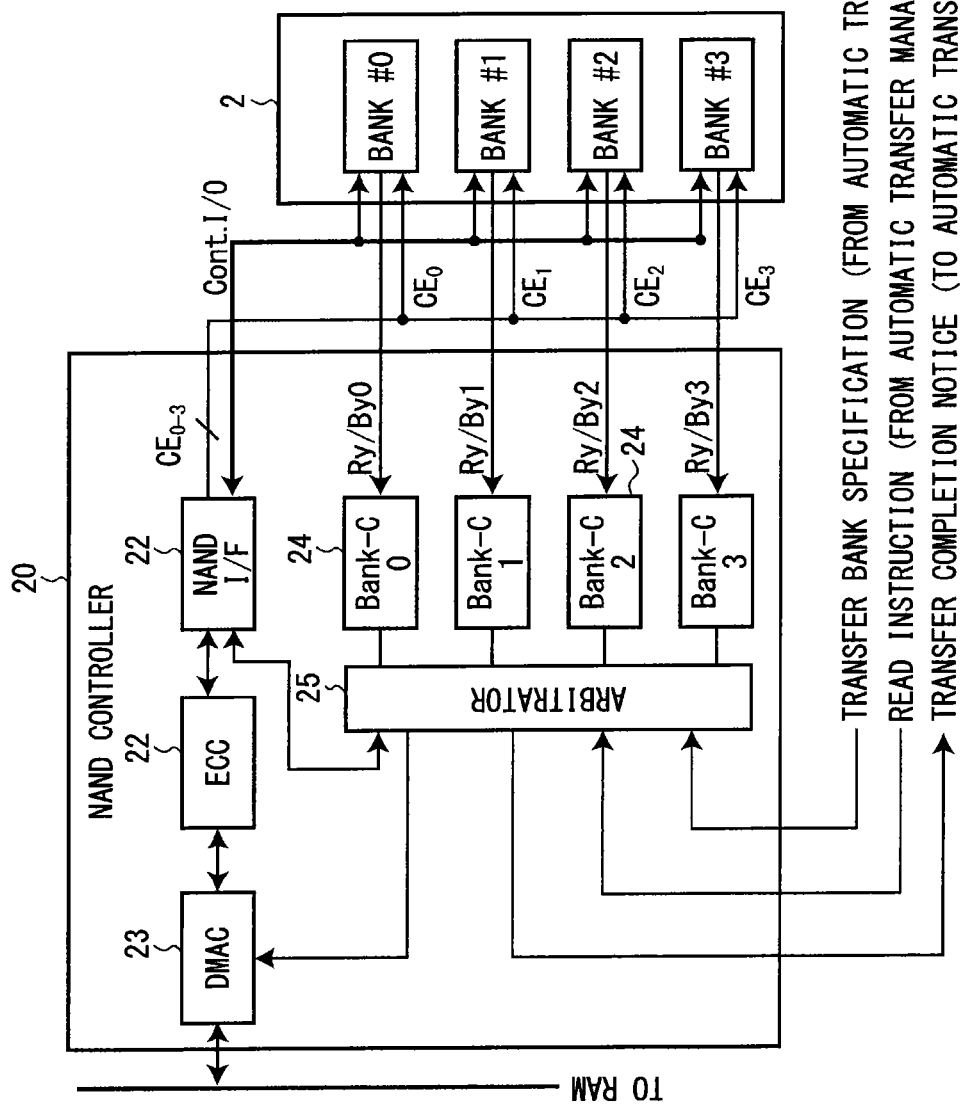
FIG. 2 is a diagram showing how a NAND controller and a NAND memory are connected together.

FIG. 2 shows an internal configuration of the NAND controller 20, and how the NAND controller 20 and the NAND memory 2 are connected together. The NAND controller 20 controls the multiple banks (the bank #0 to the bank #3), which share a control I/O signal line (CtrlI/O), independently of each other, by use of four chip enable signals (CE0 to CE3). Ry/By signals (Ry/By0 to Ry/By3) are outputted from the banks of the NAND memory 2 to the NAND controller 20, the Ry/By signals each indicating whether the corresponding bank is ready or busy. Let us assume that: Ry/By=L represents that the corresponding bank is busy; and Ry/By=H represents that the bank is ready. In the case where each bank includes the multiple memory chips, their Ry/By signal lines are commonly connected together, and their chip enable signal lines are commonly connected together. The control I/O signal line has an 8-bit bus width, or a 16-bit bus width, for example. Various commands, addresses and data are transferred through this signal line.

As shown in FIG. 2, the NAND controller 20 includes: a NAND interface (NANDI/F) 21; an error correction circuit (ECC) 22; and a direct memory access controller (DMAC) 23 for controlling a DMA transfer between the DMAC 23 and the RAM 3. The chip enable signals CE (CE0 to CE3) of the four respective banks are connected to the NANDI/F 21. The NANDI/F21 controls the chip enable signals CE0 to CE3 depending on which bank is to be accessed. In addition, for the purpose of making the four banks operate independently of one another, the NANDI/F 21 includes four bank controllers (BANK-Cs) 24 for managing the statuses of the banks by monitoring the Ry/By signals (Ry/By0 to Ry/By3) which are connected to the banks, respectively. Each BANK-C 24 has a function of queuing a request (instruction) issued to its corresponding bank. In a case where a read, write or erase request is issued to a bank, a BANK-C 24 which manages the bank secures the right of use of the control I/O signal line, and causes the request to be executed for the bank. An arbitrator 25 arbitrates a right of use of the control I/O signal line among the banks in accordance with a predetermined regulation while monitoring the NANDI/F 21 and the BANK-Cs 24. The read instructions and the transfer bank specifications are inputted into the arbitrator 25 from the automatic transfer manager 40, and the transfer completion notices are outputted from the arbitrator 25 to the automatic transfer manager 40. In accordance with the above-described scheme, the NAND controller 20 causes read instructions to be sequentially outputted into the multiple banks #0 to #3, respectively, via the control I/O signal line depending on the use status of the control I/O signal line, and the use statuses of the multiple banks #0 to #3 (Ry/By0 to Ry/By3). The NAND controller 20 may be packaged as a hardware module.

Figure 3:
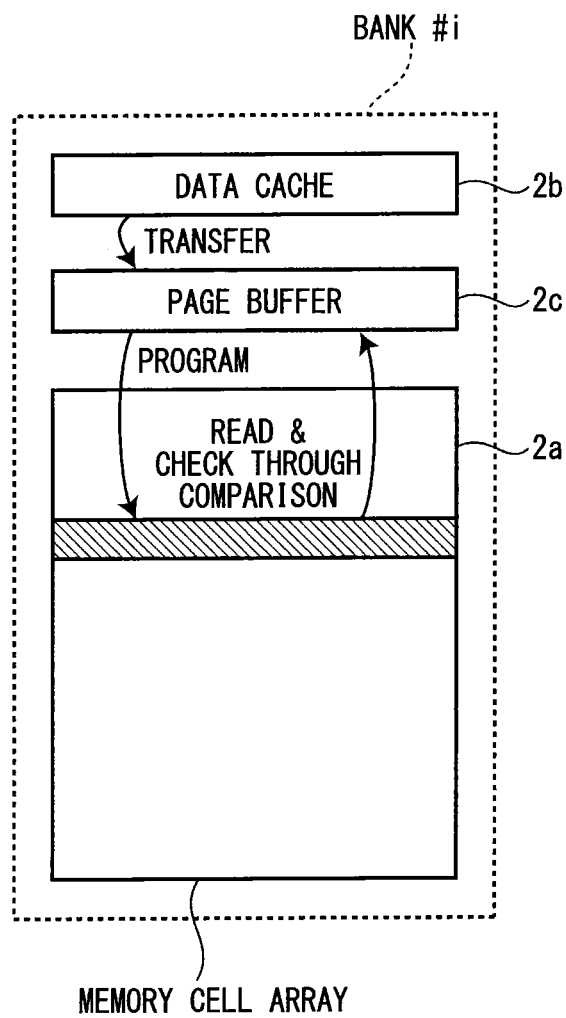
FIG. 3 is a diagram showing an example of an internal configuration of a bank.

FIG. 3 shows an internal configuration of a bank. Each bank includes: a memory cell array 2a in which multiple memory cells are arrayed in a matrix; a data cache 2b; and a page buffer 2c. In a case of writing to the bank, a page of transferred data to be transmitted from the NAND controller 20 to the bank is temporarily stored in the data cache 2b. The transferred data, which is accumulated in the data cache 2b, is programmed into the memory cell array 2a via the page buffer 2c. The programmed data is read, and is checked through a comparison with the transferred data stored in the page buffer 2c. In the case of the writing, the Ry/By signal is turned from ready to busy, once a transfer phase for transferring the write command, which includes write addresses and the data to be written, is completed. Thereafter, the Ry/By signal is turned from busy to ready once the check through the comparison is completed.

On the other hand, in a case of reading from the bank, data read from the memory cell array 2a is temporarily accumulated in the data cache 2b via the page buffer 2c. In the case of the reading, the Ry/By signal is turned from ready to busy, once a transfer phase for transferring the read instruction, which includes a read address, is completed. The read data is temporarily accumulated in the data cache 2b from the memory cell array 2a via the page buffer 2c. The Ry/By signal is turned from busy to ready, once the data is ready to be transferred to the NAND controller 20. Incidentally, the time needed for the read process is extraordinarily shorter than the time needed for the write process.

When the host 100 is to perform read or write on the SSD 200, the host 100 inputs Logical Block Addressing (LBA) addresses, as logical addresses, to the SDD 200. LBA addresses are logical addresses represented by serial numbers starting at 0 which are assigned to respective sectors (each having a size of 512 B). The page size is larger than the sector size. In the SSD 200, management units for managing the RAM 3 and the NAND memory 2 may be defined in addition to sectors, pages and blocks. However, descriptions of the management units will be omitted.

In the SSD 200, the blocks are classified into a group of free blocks FB and a group of active blocks AB, the two groups are managed independently of each other. A free block FB is defined as a block which includes no effective data, and to which no use is applied. An active block AB is defined as a block which includes effective data, and to which use is applied. The SSD 200 manages relationships between the logical addresses, as the LBA addresses used between the SSD 200 and the host 100, and the physical addresses representing the actual storage locations in the NAND 2, respectively. The SSD 200 uses a logical-physical conversion technique in which the relationships between the logical addresses and the physical addresses are not statically determined in advance and instead are dynamically related to each other in the course of writing data.

For example, in a case where data is overwritten in the same LBA address, the block conversion is performed as follows. Let us assume that effective data is retained in a logical address A1; and a block B1 is used as a memory area. When the SSD 200 receives a command from the host 100 that the data (size thereof is assumed to be the same as a block) retained in the logical address A1 be overwritten, the SSD 200 secures one free block FB (assume that this free block FB is a block B2), and writes the data received from the host 100 in the free block FB. Subsequently, the SSD 200 associates the logical address A1 with the block B2. As a result, the block B2 becomes an active block AB, while the block B1 becomes a free block FB because the data retained in the block B1 is made ineffective. In this manner, each time the SSD 200 writes in data, the SSD 200 changes the block which is used as the actual memory area for the data even though the data is stored in the same logical address A1.

Next, using FIGS. 4A to 5C, descriptions will be provided for multiple comparative examples and the embodiment in terms of how a process of reading from the NAND memory 2 having the foregoing bank configuration (a process of transferring data from the NAND memory 2 to the RAM 3) is performed.

Figure 4:
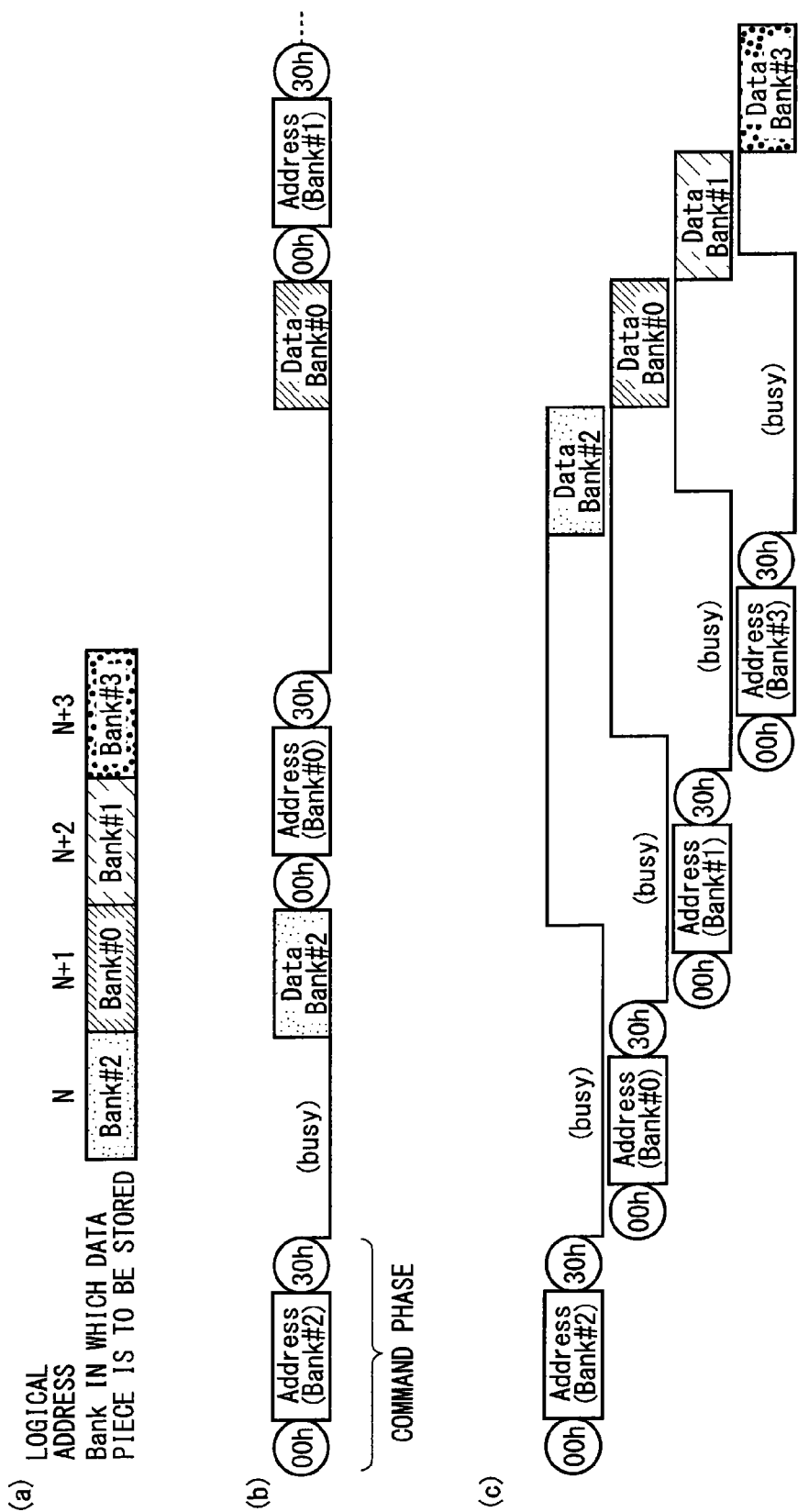
FIGS. 4A to 4C are time charts showing bank switching methods of comparative examples.

First of all, descriptions will be provided for two comparative examples by use of FIG. 4. Let us assume that, as shown in FIG. 4A, the SSD 200 receives from the host 100 a read command to read pieces of data from the respective logical addresses (LBA addresses) "N," "N+1," "N+2" and "N+3." Once receiving this command, the SSD 200 has to output the pieces of data to the host 100 in an order from "N," to "N+1," "N+2" and "N+3" which are specified by the read command. In this respect, let us assume that: as shown in FIG. 4A, a piece of data corresponding to the LBA address "N" is stored in the bank #2; a piece of data corresponding to the LBA address "N+1" is stored in the bank #0; a piece of data corresponding to the LBA address "N+2" is stored in the bank #1; and a piece of data corresponding to the LBA address "N+3" is stored in the bank #3.

In a first comparative example shown in FIG. 4B, the read instructions are sequentially inputted in an order of the LBA addresses of the respective pieces of data with no bank interleaving being performed, and a sequential transfer is performed in which the data transfer (from the NAND memory 2 to the RAM 3) is performed in the same order as the input of the read instructions. In the first comparative example, once the inputting of a read instruction and the data transfer are completed for one bank, the inputting of a read instruction and the data transfer is performed for the next bank. Incidentally, FIG. 4B shows a command sequence which includes 00h-address-30h as a read instruction. However, the command sequence is not limited to the example shown in FIG. 4B.

In a second comparative example shown in FIG. 4C, although the read instructions are sequentially inputted in the order of the LBA addresses of the respective pieces of data, the bank interleaving is performed in a way that a read instruction is inputted into its corresponding bank while the previous bank is busy (while a piece of data is read from the memory cell array 2a and the thus-read data is stored in the data cache 2b; see FIG. 3).

No improvement in the data transfer efficiency can be expected from the first comparative example because the instruction input and the data transfer are sequentially carried out. On the contrary, in the second comparative example, the busy time can be sufficiently covered in the case of the write process in which the busy time for each bank is much longer than that in the case of the read process. However, the busy time cannot be sufficiently covered in the case of the read process because the time needed for the data transfer is shorter than the busy time. This lowers the performance.

Figure 5:
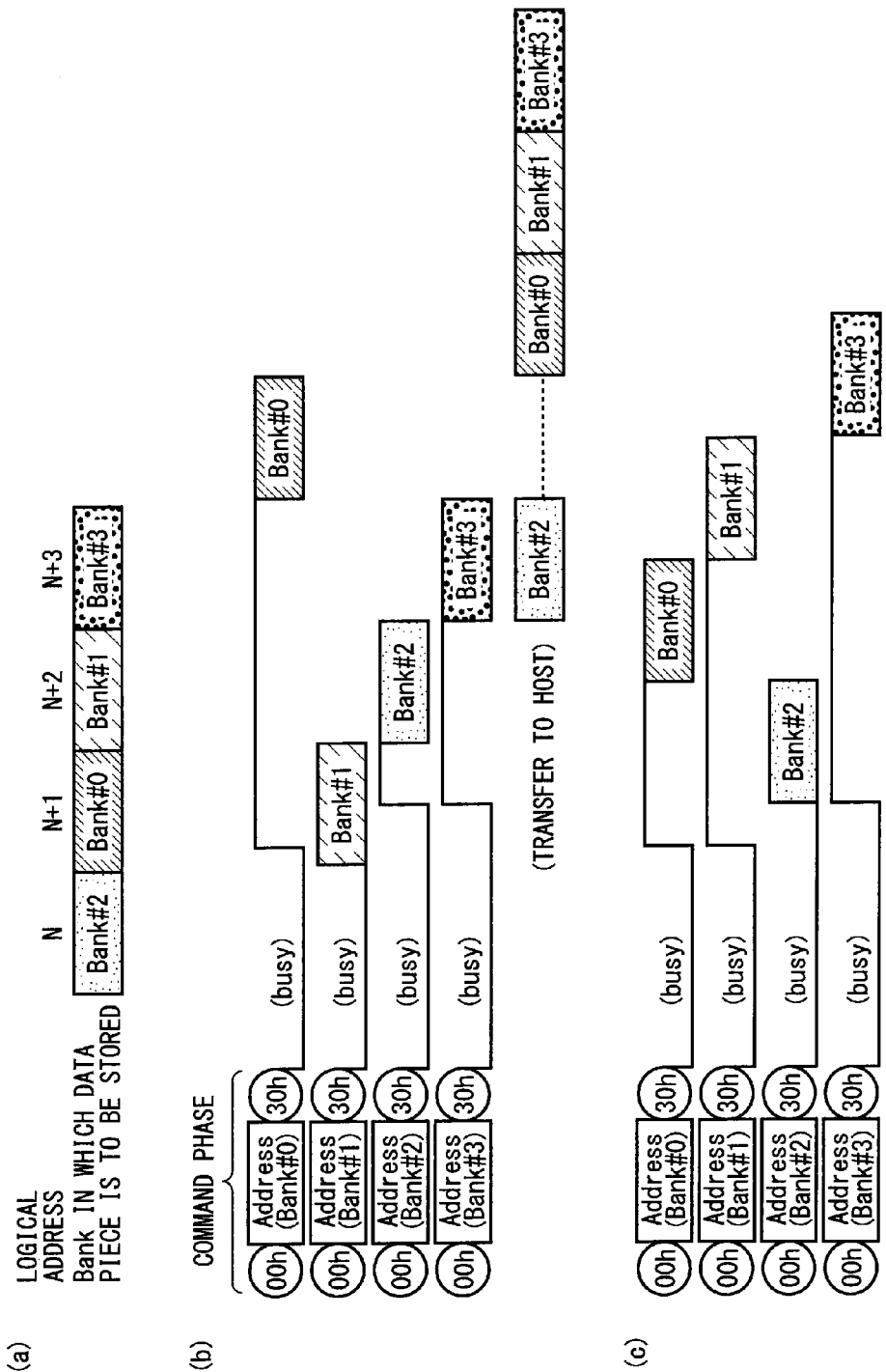
FIGS. 5A to 5C are time charts showing a bank switching method of another comparative example and a bank switching method of the embodiment.

Next, descriptions will be provided for processes performed in a third comparative example and the embodiment by use of FIG. 5. FIG. 5A is identical to FIG. 4A, and shows the LBA addresses specified by the read command and the banks in which the data pieces are to be stored, the banks respectively corresponding to the LBA addresses. In the third comparative example, the read instructions are inputted into the banks in parallel irrespective of the order of the LBA addresses. The data transfer from the banks to the RAM 3 is performed in an order of rotation based on a simple round robin method, the order starting from a bank whose Ry/By signal has turned from busy to ready first. In FIG. 5B, the bank #1 is released from busy earliest among the banks. After the data transfer from the bank #1 is completed, the data transfer is performed in an order from the bank #2 to the bank #3 and the bank #0 in accordance with the rotation based on the round robin method. It should be noted that, because the banks share the control I/O signal line, the commands cannot be inputted in parallel completely. However, the command phases are shown in parallel for the sake of convenience in FIG. 5B, because the command phases are much shorter than the data transfer phases. In the third comparative example, it is easier to cover each busy time because the read commands are issued in parallel as a batch for multiple pieces of data. However, in the third comparative example, the order of the data transfer from the NAND memory 2 to the RAM 3 does not necessarily coincide with the order of the LBA addresses specified by the host 100. For this reason, in this method, it is required to manage the progress in the data transfer to be performed at random; to rearrange the pieces of data on the RAM 3; and to sequentially transfer the thus-rearranged pieces of data to the host 100. Accordingly, a large memory area, such as the RAM 3, is needed for the rearrangement. In addition, the data transfer speed is lowered by the time needed for the rearrangement.

With the foregoing point taken into consideration, in the embodiment, the data transfer from the NAND memory 2 to the RAM 3 is performed with the order of the data transfer made to coincide with the order of the LBA addresses specified by the host 100, although as in the third comparative example shown in FIG. 5B, the read commands are inputted into the banks in parallel irrespective of the order of the LBA addresses. FIG. 5C shows the process performed in the embodiment. In the process, the order of the data transfer from the NAND memory 2 to the RAM 3 is made to coincide with the order of the LBA addresses shown in FIG. 5A (in the order of the bank #2, the bank #0, the bank #1, the bank #3). To put it specifically, in FIG. 5C, although the bank #1 is released from busy earliest among the banks, the data transfer from the bank #1 is made to wait at this moment because the piece of data corresponding to the bank #1 should be transferred third in the order. Subsequently, at the time when the bank #2 from which the piece of data should be transferred first in the order is released from busy, the bank #2 is made to transfer the piece of data. Because the bank #0 from which the piece of data should be transferred second in the order is already released from busy at the time when the data transfer from the bank #2 is completed, the bank #0 is made to immediately transfer the piece of data. The pieces of data in the bank #1 and the bank #3 are sequentially transferred in the same manner. For this reason, the embodiment no longer needs any large memory area for rearranging the pieces of data. In addition, the embodiment no longer performs the rearrangement, and is accordingly capable of curbing the decrease in the data transfer speed.

Figure 6:
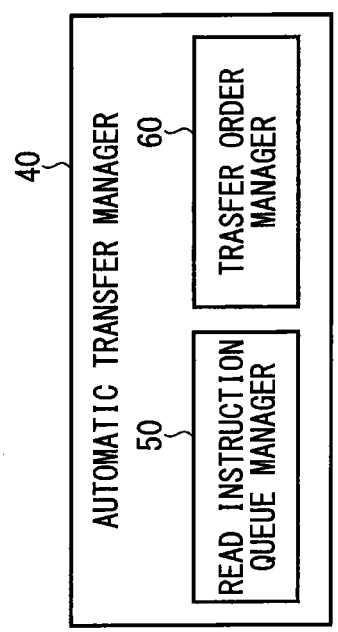
FIG. 6 is a block diagram showing an example of an internal configuration of an automatic transfer manager.

Detailed descriptions will be provided hereinbelow for the embodiment. FIG. 6 is a diagram showing an internal function configuration of the automatic transfer manager 40. As described above, the automatic transfer manager 40 is the host control module for the NAND controller 20. The automatic transfer manager 40 includes a read instruction queue manager 50 and a transfer order manager 60. The read instruction queue manager 50 converts read commands received from the firmware installed in the MPU 45 to read instruction sequences for the respective banks, which are to be given to the NAND controller 20, and outputs the thus-converted read instruction sequences for the respective banks to the NAND controller 20. The transfer order manager 60 manages the NAND controller 20 in order that the data transfer from each banks in the NAND memory 2 to the RAM 3, which is performed by the NAND controller 20, should be performed in the order of the LBA addresses specified by the host 100. The automatic transfer manager 40 may be packaged as a hardware module for the purpose of speeding up the data transfer process.

Figure 7:
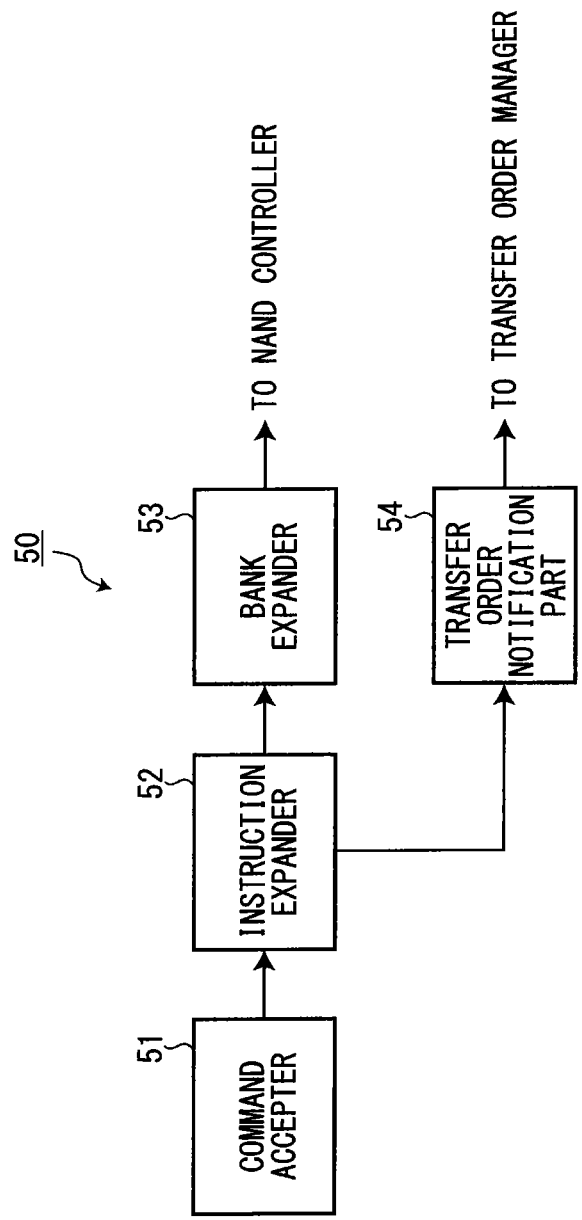
FIG. 7 is a block diagram showing an example of an internal configuration of a read instruction queue manager.

FIG. 7 is a diagram showing an internal function configuration of the read instruction queue manager 50. The read instruction queue manager 50 includes a command accepter 51, an instruction expander 52, a bank expander 53 and a transfer order notification part 54. The command accepter 51 accepts read commands received from the firmware installed in the MPU 45, and sequentially outputs the thus-accepted read commands to the instruction expander 52. Each read command which the command accepter 51 receives from the host 100 includes: a code representing the read command; a leading logical address; and a read size (the number of sectors), for example. The instruction expander 52 converts (splits) the received read commands into read instruction sequences which the NAND controller 20 are capable of processing. Because the NAND controller 20 performs a read process in which the largest size of data capable of being processed is equal to one page, the instruction expander 52 expands each of the read commands received from the command accepter 51 to a sequence of read instructions each fragmented to a size equal to or smaller than one page, on the basis of the memory locations of the corresponding read data pieces on the NAND memory 2.

As mentioned above, the management tables for managing the NAND memory 2 are stored in the NAND memory 2. The management tables are expanded on the RAM 3 when the power supply is turned on, and are used and updated. The management tables include a logical-physical conversion table which represents the relationship between the logical addresses (LBA addresses) supplied from the host 100 and the physical addresses indicating locations on the NAND memory 2 where the respective pieces of data are stored. Referring to this logical-physical conversion table, the instruction expander 52 creates the read instruction sequences in each of which the corresponding read command is fragmented into read instructions having the size equal to or smaller than the page unit in accordance with the memory locations of the pieces of read data on the NAND memory 2, and the read instructions are arranged in accordance with the order of the LBA logical addresses. Each read instruction includes a transfer mode (identifying read, write, erase or the like), a bank number, and an address used in a bank (or a pointer address for pointing an entry in the table which indicates the address used in the bank).

The bank expander 53 has instruction queues respectively for the bank #0 to the bank #3. The bank expander 53 allocates each of the read instruction sequences expanded by the instruction expander 52 to the instruction queue for the corresponding bank. To put it specifically, because the read instructions each have the bank number as information, the bank expander 53 allocates each instruction sequence to a corresponding one of the bank instruction queues for the respective banks, on the basis of the bank number. The instruction queues in the bank expander 53 output the read instructions, which are registered in the respective instruction queues, to the NAND controller 20. The bank controllers (Bank-C0 to Bank-C3) 24 in the NAND controller 20 shown in FIG. 2 have instruction queues for queuing the instructions for the banks, respectively. For this reason, the instruction sequences for the respective banks, which are outputted from the bank expander 53, are inputted into the bank controllers 24 managing the corresponding banks.

On the basis of the read instruction sequences expanded by the instruction expander 52, the transfer order notification part 54 creates an order of the bank numbers (hereinafter referred to as "transfer order information pieces") for making the order of the data transfer from the banks in the NAND memory 2 to the RAM 3 coincide with the order of the LBA addresses specified by the host 100. Thereafter, the transfer order notification part 54 notifies the transfer order manager 60 of the created transfer order information pieces. Because, as described, the read instructions arranged in the order of the LBA addresses have their own bank numbers as information, the transfer order notification part 54 creates the transfer order information pieces on the basis of the bank numbers.

Figure 8:
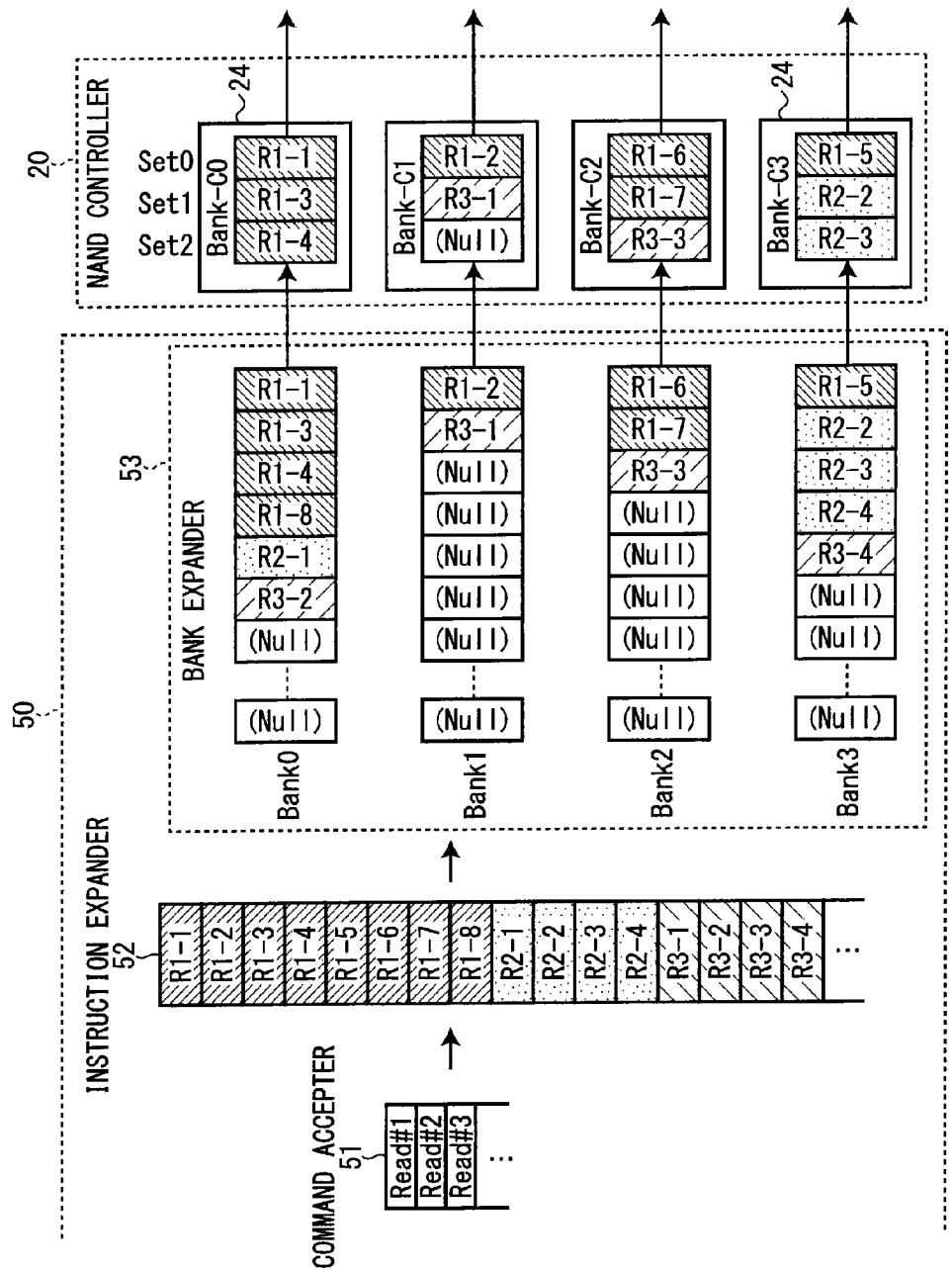
FIG. 8 is a diagram showing an instruction expanding process performed in the read instruction queue manager.

FIG. 8 is a diagram conceptually showing how the read instruction queue manager 50 converts the commands into the instruction sequences. In FIG. 8, the command accepter 51 receives three read commands "Read#1," "Read#2" and "Read#3" from the firmware. The instruction expander 52 expands the read command "Read#1" to eight read instructions "R1-1" to "R1-8," expands the read command "Read#2" to four read instructions "R2-1" to "R2-4," and expands the read command "Read#3" to four read instructions "R3-1" to "R3-4." The order of the read instructions "R1-1" to "R1-8" is in accordance with the order of the LBA logical addresses. The order of the read instructions "R2-1" to "R2-4" and the order of the read instructions "R3-1" to "R3-4" are in accordance with the order of the LBA addresses as well. The bank expander 53 has the multiple instruction queues for the respective banks. The bank expander 53 allocates each of the instruction sequences received from the instruction expander 52 to the instruction queue of the corresponding bank. The instruction sequences allocated to the instruction queues of the corresponding banks are inputted into the instruction queues provided to the bank controllers 24 in the NAND controller 20, respectively. The bank controllers 24 in the NAND controller 20 inputs the read instruction sequences into the NAND memory 2 in parallel, as shown in FIG. 5C, in accordance with the instruction sequences registered in the instruction queues.

Figure 9:
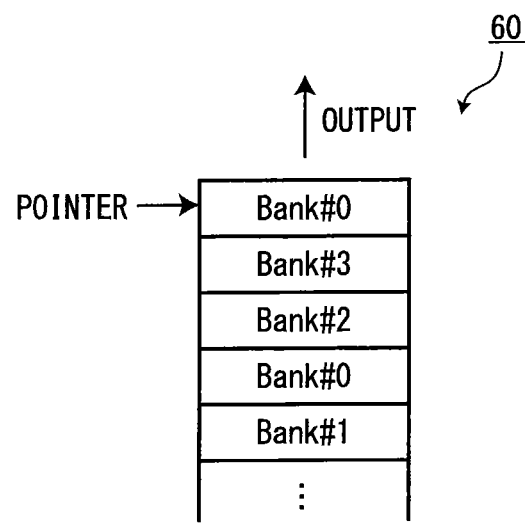
FIG. 9 is a diagram showing an example of an internal configuration of a transfer order manager.

FIG. 9 shows an example of a concrete configuration of the transfer order manager 60 shown in FIG. 6. As described above, the transfer order manager 60 manages the NAND controller 20 in order that the data transfer from the banks in the NAND memory 2 to the RAM 3 which is performed by the NAND controller 20 should be performed in the order of the LBA addresses specified by the host 100. As described above, the transfer order notification part 54 in the read instruction queue manager 50 creates the transfer order information pieces, and notifies the transfer order manager 60 of the transfer order information pieces. In the case shown in FIG. 8, the transfer order information pieces notified to the transfer order manager 60 by the transfer order notification part 54, that is to say, the order of the bank numbers, are "bank #0 (R1-1)", "bank #1 (R1-2)", "bank #0 (R1-3)", "bank #0 (R1-4)", "bank #3 (R1-5)", "bank #2 (R1-6)", "bank #2 (R1-7)", "bank #0 (R1-8)", "bank #0 (R2-1)", "bank #3 (R2-2)", "bank #3 (R2-3)", "bank #3 (R2-4)", "bank #1 (R3-1)", "bank #0 (R3-2)", "bank #2 (R3-3)", and "bank #3 (R3-4)".

The transfer order manager 60 shown in FIG. 9 has, for example, an FIFO (first-in first-out) structure. For this reason, the transfer order manager 60 enters the transfer order information pieces notified by the transfer order notification part 54, into a FIFO queue in accordance with the order of notification. In the case shown in FIG. 8, "bank #0", "bank #1", "bank #0", "bank #0", "bank #3", "bank #2", "bank #2", "bank #0", "bank #0", "bank #3", "bank #3", "bank #3", "bank #1", "bank #0", "bank #2", and "bank #3" are notified as the transfer order information pieces. For this reason, the transfer order manager 60 stores the transfer order information pieces in the FIFO queue in this order. The transfer order information pieces (the bank numbers) stored in the FIFO queue are sequentially outputted into the NAND controller 20 as transfer bank specification information pieces. The NAND controller 20 selects the banks to be transferred to the RAM 3 one after another in accordance with the transfer bank specification information pieces received from the transfer order manager 60. Each time the NAND controller 20 completes the data transfer corresponding to one read instruction, the NAND controller 20 sends a transfer completion notice to the automatic transfer manager 40. Each time the transfer order manager 60 receives the transfer completion notice, the transfer order manager 60 increments an output pointer by one. A bank number stored in an entry in the FIFO queue which is pointed by the pointer incremented by one is outputted to the NAND controller 20 as a transfer bank specification information piece.

Figure 10:
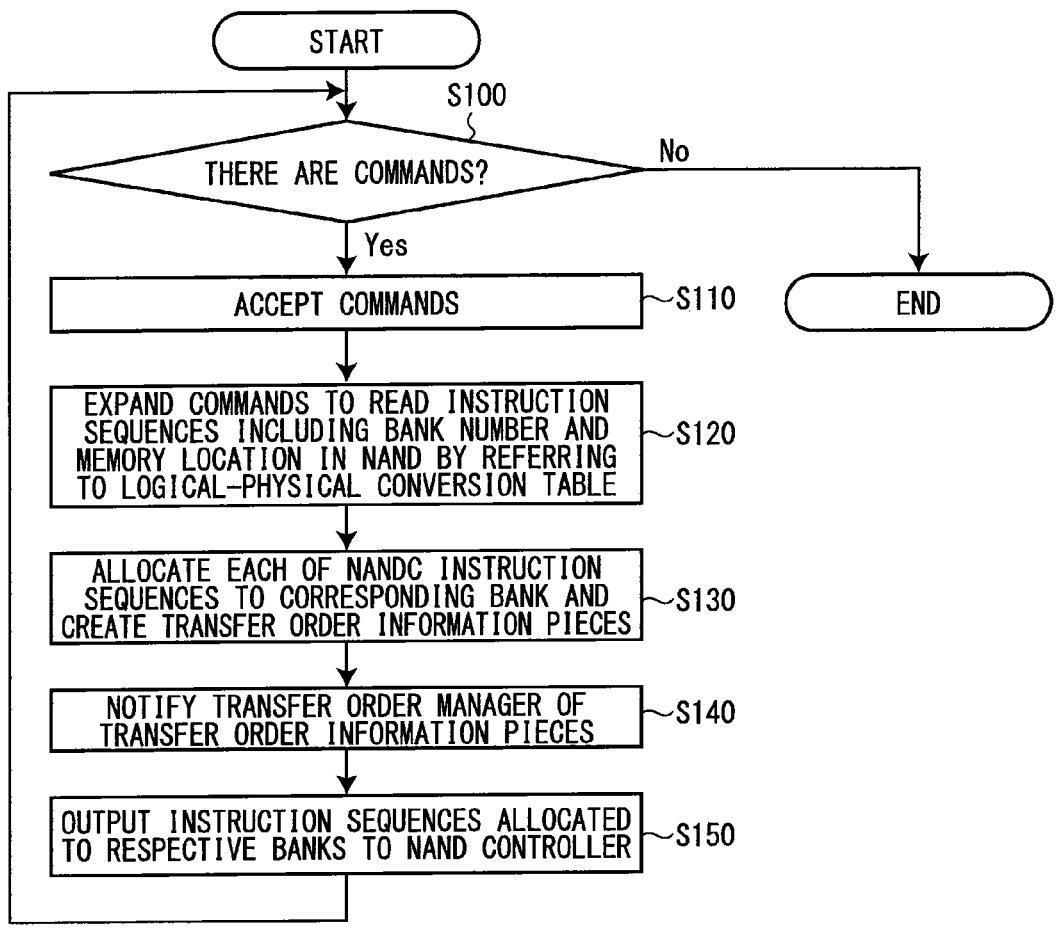
FIG. 10 is a flowchart showing operational procedures of the read instruction queue manager.
Figure 11:
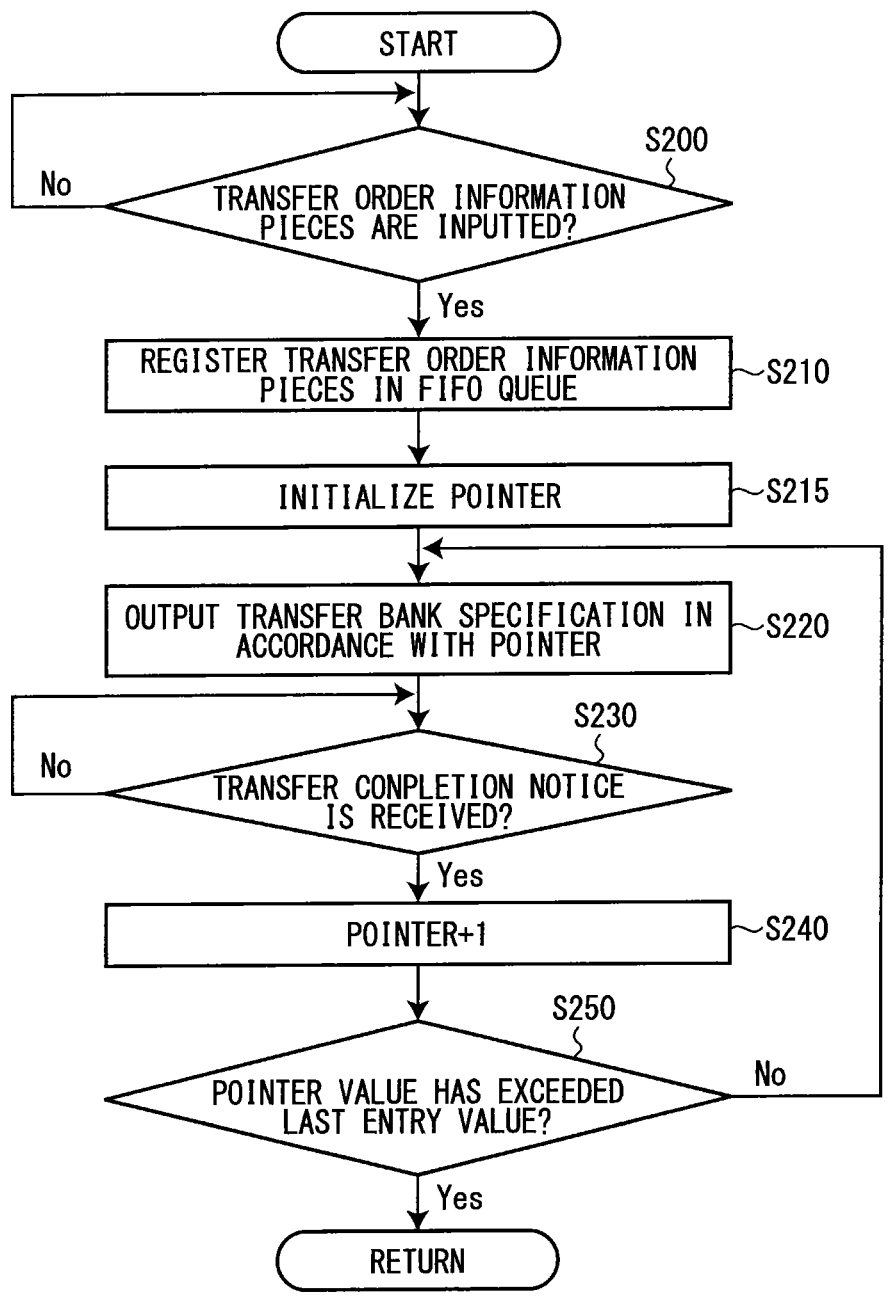
FIG. 11 is a flowchart showing operational procedures of the transfer order manager.
Figure 12:
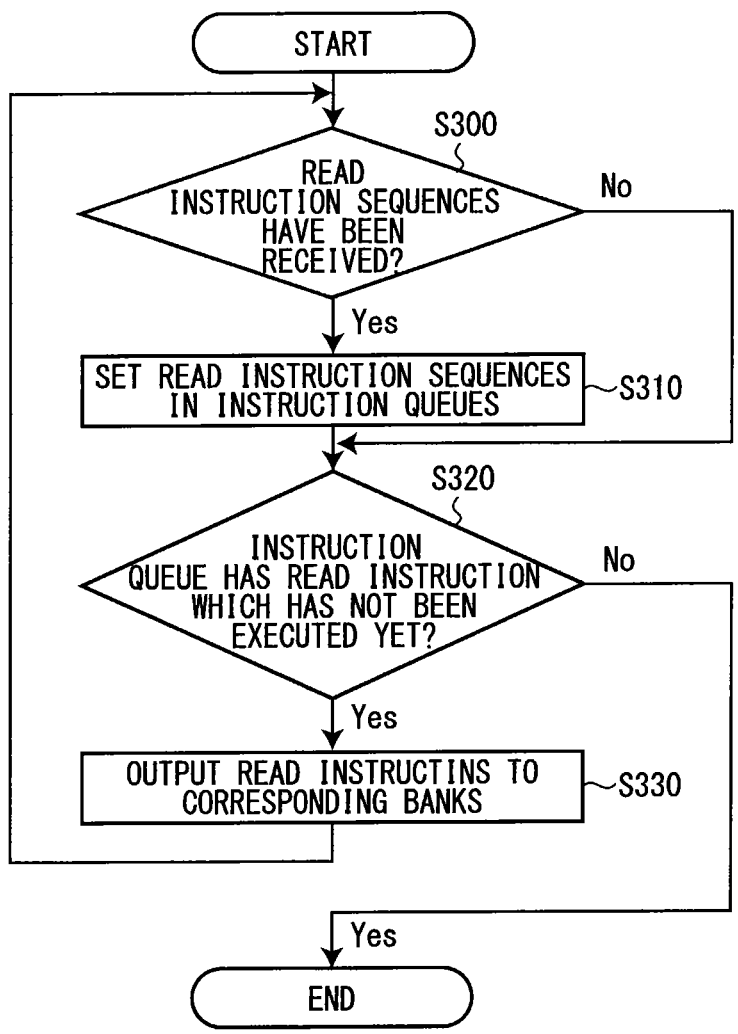
FIG. 12 is a flowchart showing instruction output procedures of the NAND controller.
Figure 13:
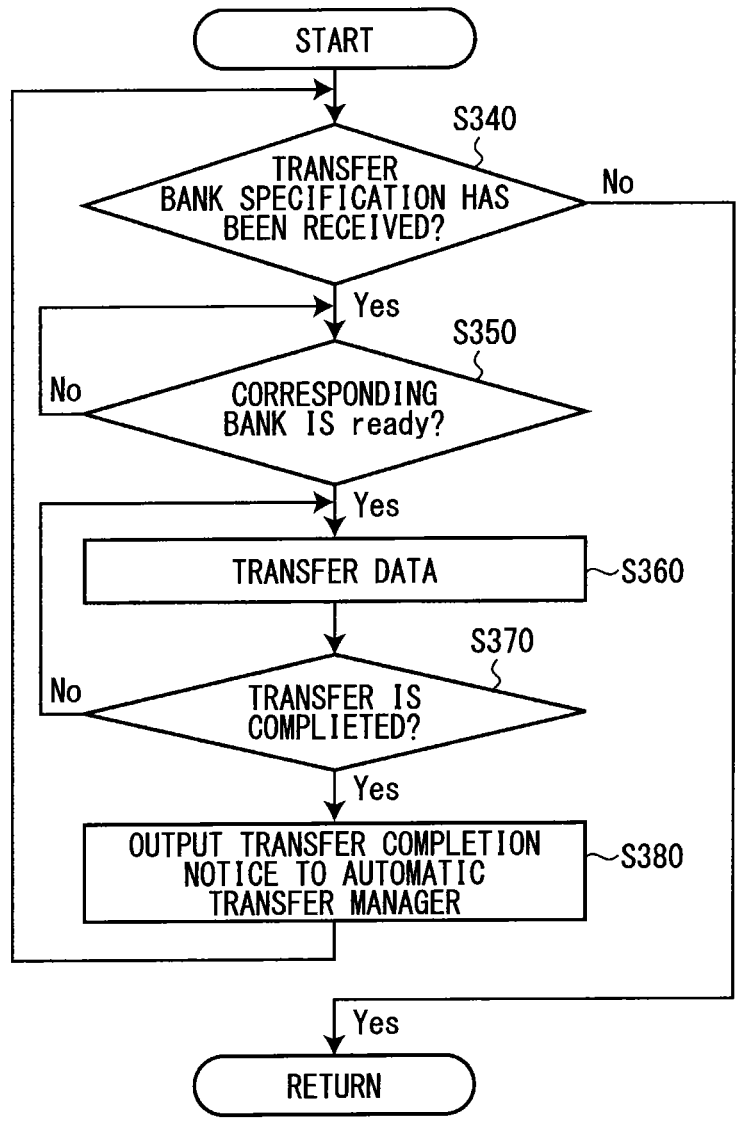
FIG. 13 is a flowchart showing data transfer procedures of the NAND controller.

Next, using FIGS. 10 to 13, descriptions will be provided of the read process performed by the automatic transfer manager 40 and the NAND controller 20. FIG. 10 shows operational procedures of the read instruction queue manager 50 in the automatic transfer manager 40. FIG. 11 shows operational procedures of the transfer order manager 60 in the automatic transfer manager 40. FIG. 12 shows operational procedures of a process of outputting a read instruction from the NAND controller 20 to the NAND memory 2. FIG. 13 is operational procedures of transferring data from the NAND memory 2 in the NAND controller 20 to the RAM 3.

Once receiving the read commands from the firmware, the command accepter 51 in the read instruction queue manager 50 accepts the received read commands (step S110 in FIG. 10), and outputs the accepted read commands to the instruction expander 52. Once receiving the read commands, the instruction expander 52 creates the read instruction sequences by referring to the logical-physical conversion table, as shown in FIG. 8 (step S120). In each of the read instruction sequences, the corresponding read command is fragmented into read instructions having the size equal to or smaller than the page unit in accordance with the storage locations of the pieces of read data on the NAND memory 2, and the read instructions are arranged in the order of the LBA addresses specified by the host 100. As described above, each read instruction includes the transfer mode, the bank number, and the address used in the bank. The instruction expander 52 inputs the read instruction sequences thus created into the bank expander 53 and the transfer order notification part 54. As shown in FIG. 8, the bank expander 53 allocates each of the instruction sequence received from the instruction expander 52 to the instruction queue of the corresponding bank (step S130). In addition, the transfer order notification part 54 creates the aforementioned transfer order information pieces on the basis of the expanded read instruction sequences (step S130). The transfer order notification part 54 notifies the transfer order manager 60 of the created transfer order information pieces (step S140). Furthermore, the bank expander 53 outputs the read instructions allocated to the respective instruction queues to the NAND controller 20, as shown in FIG. 8 (step S150).

On the other hand, once the transfer order manager 60 is notified of the transfer order information pieces by the read instruction queue manager 50, the transfer order manager 60 registers the notified transfer order information pieces in the FIFO queue (steps S200 and S210 in FIG. 11). Subsequently, the transfer order manager 60 initializes the pointer, and outputs, to the NAND controller 20, the data piece registered in the FIFO queue which is pointed by the pointer, as the transfer bank specification (Step S220). Thereafter, the transfer order manager 60 waits until the transfer order manager 60 receives the transfer completion notice. Once receiving the transfer completion notice from the NAND controller 20 (Yes in step S230), the transfer order manager 60 increments the pointer by one (step S240), and then judges whether or not the pointer value exceeds the last entry value among the bank numbers included in the transfer order information pieces (step S250). If the pointer value does not exceed the last entry value, the transfer order manager 60 outputs the data piece registered in the FIFO queue which is pointed by the pointer to the NAND controller 20 as the transfer band specification (step S220). In this manner, until the pointer value exceeds the last entry value, the transfer order manager 60 increments the pointer by one each time the transfer order manager 60 receives the transfer completion notice, and sequentially outputs the data pieces registered in the FIFO queue which is pointed by the pointer, to the NAND controller 20 as the transfer bank specification. If the pointer exceeds the last entry value, the transfer order manager 60 returns to the start of the process procedures, and performs the process in the same manner again.

For the sake of convenience, FIG. 11 shows the case in which: once a process for entries included in a transfer order information piece is completed, a judgment is made on whether or not the next transfer order information piece is inputted; and if the next transfer order information piece exists, this transfer order information piece is registered in the FIFO queue. However, the following scheme may be adopted. In a case where a transfer order information piece is inputted before the completion of a process for entries included in the preceding transfer order information piece, this inputted transfer order information piece is registered in the FIFO queue at the moment of its input.

Next, referring to FIG. 12, descriptions will be provided for a process in which the NAND controller 20 outputs read instructions to the NAND memory 2. When the NAND controller 20 receives the read instruction sequences each allocated to the corresponding bank from the bank expander 53 in the read instruction queue manager 50 (step S300), the arbitrator 25 allocates the received instruction sequences to the corresponding bank controllers (Bank-C0 to Bank-C3) 24 by referring to the bank numbers in the read instruction sequences. It goes without saying that a scheme may be adopted in which: multiple signal lines corresponding to the respective banks as shown in FIG. 8 are provided between the arbitrator 25 and the bank expander 53; and the arbitrator 25 judges a bank corresponding to each read instruction sequence by use of the signal lines for the respective banks. In a case where no read instruction sequence is received in step S300, the process proceeds to step S320.

The bank controllers 24 set the received read instruction sequences in the instruction queues in the bank controllers 24, respectively (step S310). Subsequently, each bank controller 24 judges whether or not its instruction queue has a read instruction which has not been executed yet (step S320). If the instruction queue has a read instruction which has not been executed yet, the bank controller 24 fetches a read instruction at the top of the read instruction sequence, and outputs the fetched read instruction to the arbitrator 25. The arbitrator 25 monitors the NANDI/F 21 and the bank controllers 24, and arbitrates the right of use of the control I/O signal line among the read instructions received from the respective bank controllers 24, in accordance with the predetermined rule. Thereby, the arbitrator 25 outputs the read instructions received from the respective bank controllers 24, to the NAND memory 2 in parallel (exactly speaking, sequentially as shown in FIG. 13 or as in the case of instruction phases marked with the letter "C" in FIG. 14) through the NANDI/F 21 and the control I/O signal line. In this respect, the NANDI/F 21 asserts a chip enable signal CE corresponding to the bank to which the right of use of the control I/O signal line is granted. In this manner, the read instructions are sequentially outputted to the predetermined one or more banks (step S330). After the read instructions are outputted, the process returns to step S300. Thereafter, while the further read instruction sequences are being received from the NAND controller 20, the read instructions are outputted to the NAND memory 2 until a read instruction which has not been executed yet no longer exists in the instruction queues in the respective bank controllers 24. Once a read instruction which has not been executed yet no longer exists in the instruction queues in the respective bank controllers 24, the process is terminated.

Next, referring to FIG. 13, descriptions will be provided for operational procedures of the data transfer from the NAND memory 2 to the RAM 3 by the NAND controller 20. The arbitrator 25 judges whether or not the arbitrator 25 receives a transfer bank specification from the automatic transfer manager 40 (step S340). If the arbitrator 25 receives no transfer bank specification, the arbitrator 25 goes into a state of waiting for an input of transfer bank specification. Once receiving a transfer bank specification from the automatic transfer manager 40, the arbitrator 25 judges whether a bank specified by the transfer bank specification is ready or busy by checking the corresponding Ry/By signal (step S350). Thereafter, once detecting that the bank specified by the transfer bank specification becomes ready, the arbitrator 25 causes a data transfer to be performed from the bank to the RAM 3 (step S360). To put it specifically, a control signal such as a chip enable signal CE corresponding to the bank specified by the transfer signal specification is asserted. Thereby, a data piece is fetched from the bank to the NANDI/F 21 through the control I/O signal line, and is transferred to the RAM 3 via the ECC 22 and the DMAC 23. The transferred data piece is written to the RAM 3 by the RAM controller 30.

Once detecting this data transfer is completed (step S370), the arbitrator 25 outputs the transfer completion notice to the automatic transfer manager 40 (step S380). Once receiving the inputted transfer completion notice, the automatic transfer manager 40 inputs the transfer completion notice into the transfer order manager 60 and the bank expander 53 in the read instruction queue manager 50. Once receiving the transfer completion notice, the transfer order manager 60 increments the pointer in the FIFO queue in the transfer order manager 60 by one (see steps S230 and S240 in FIG. 11). Once receiving the transfer completion notice, the bank expander 53 in the read instruction queue manager 50 outputs a read instruction sequence to be given to the NAND controller 20 next, to the NAND controller 20. For example, in the case shown in FIG. 8, with regard to the bank #1, the read instructions "R1-1," "R1-3" and "R1-4" are already outputted to the NAND controller 20. Thus, the next read instruction "R1-8" is outputted to the NAND controller 20.

Figure 14:
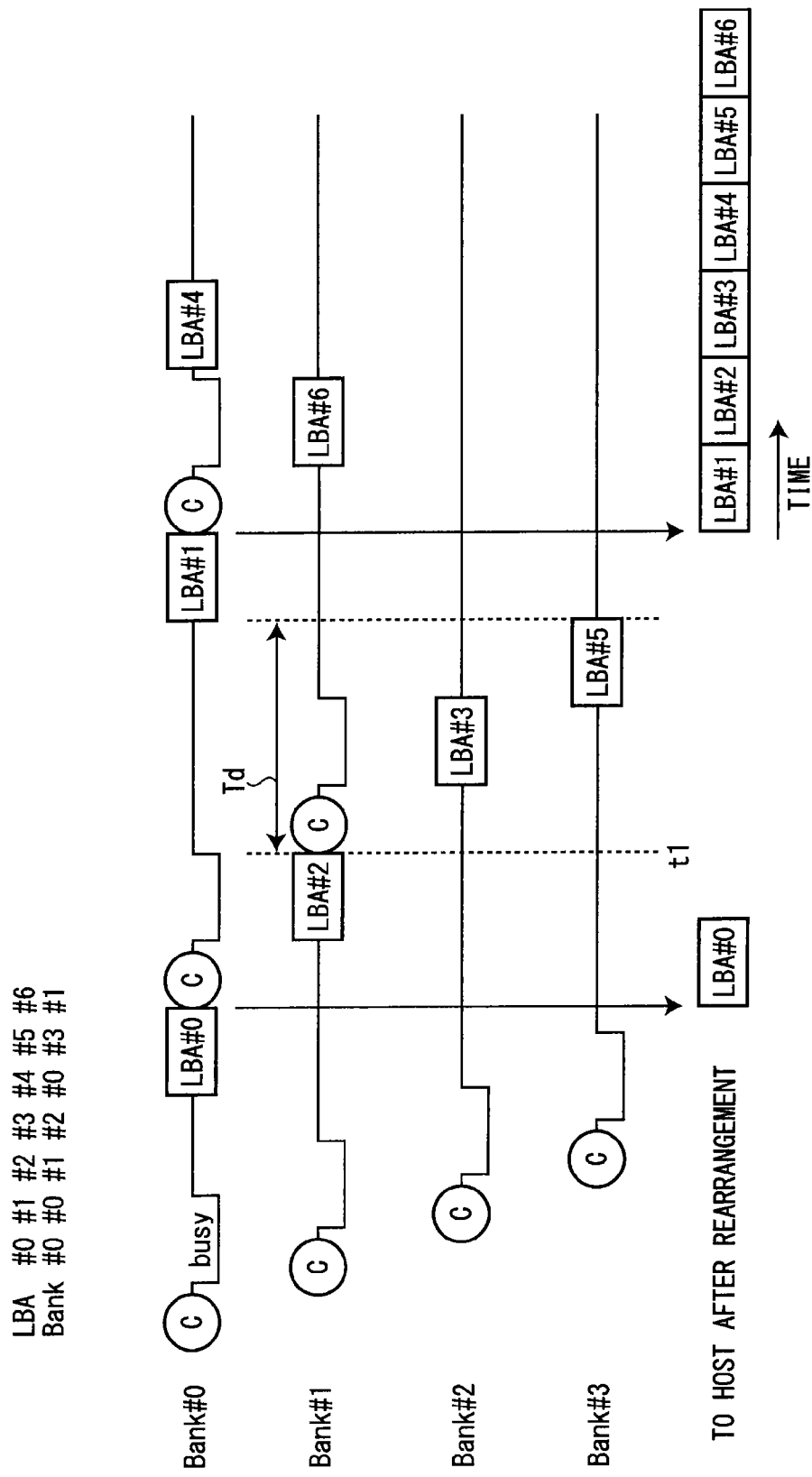
FIG. 14 is a time chart showing a bank switching method of a comparative example.

FIG. 14 shows another instance of the time chart in a case where the bank switching method of the comparative example shown in FIG. 5B is used. The case shown in FIG. 14 is similar to the case shown in FIG. 5B. Specifically, the read instructions are inputted into the banks almost in parallel irrespective of the order of the LBA addresses, and the data transfer is performed in an order of rotation based on the simple round robin method, the order starting from a bank which has turned to ready first. In this case, let us assume that LBA addresses of the read data pieces, which are specified by the host 100, are LBA#0, LBA#1, LBA#2, LBA#3, LBA#4, LBA#5 and LBA#6; and the read data pieces needs to be transferred to the host 100 in this order. In addition, let us assume that a data piece corresponding to the LBA#0 is stored in the bank #0; a data piece corresponding to the LBA#1 is stored in the bank #0; a data piece corresponding to the LBA#2 is stored in the bank #1; a data piece corresponding to the LBA#3 is stored in the bank #2; a data piece corresponding to the LBA#4 is stored in the bank #0; a data piece corresponding to the LBA#5 is stored in the bank #3; and a data piece corresponding to the LBA#6 is stored in the bank #1. Circled Cs indicate the instruction phases shown in FIG. 5.

In the method shown in FIG. 14, the data pieces to be transferred from the NAND memory 2 to the RAM 3 are not arranged in the order of the LBA logical addresses. For this reason, the data pieces are rearranged in the RAM 3 in the order of the LBA addresses, and the sorted data pieces are transferred to the host 100. In FIG. 14, at time t1, the bank #0 is released from busy, and becomes ready. Thereafter, however an unnecessary waiting time Td occurs since the data transfer is performed in accordance with the round robin rotation method, in which the data piece corresponding to the LBA #1 is transferred from the bank #0 after the data piece corresponding to the LBA #3 is transferred from the Bank #2 and the data piece corresponding to the LBA #5 is transferred from the bank #3.

Figure 15:
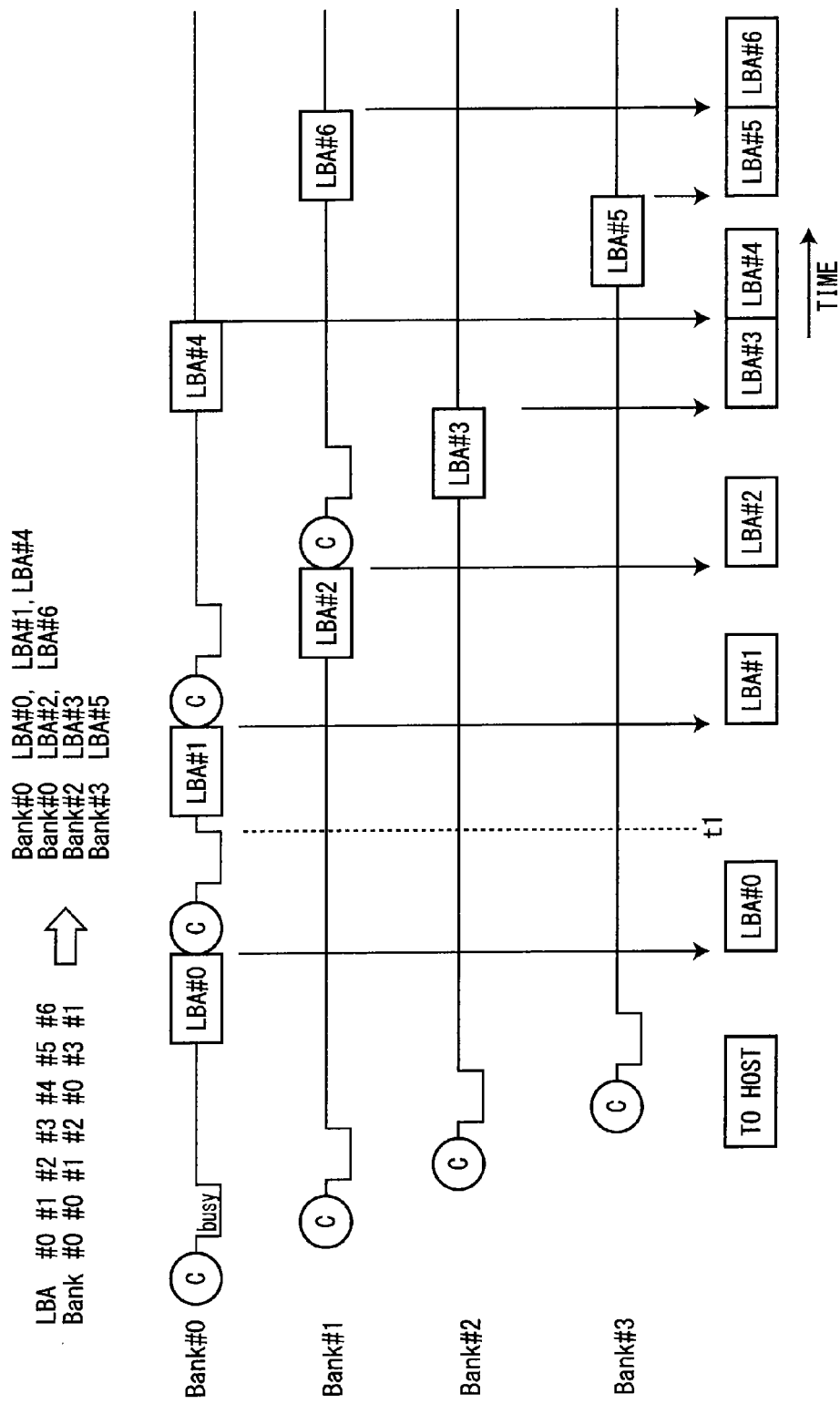
FIG. 15 is a time chart showing a bank switching method of the embodiment.

FIG. 15 shows another instance of the time chart in a case where the bank switching method of the embodiment shown in FIG. 5C is used. The relationship between the LBA addresses and the banks is the same as that shown in FIG. 14. As shown in the upper portion of FIG. 15, the read instructions corresponding to LBA#0, LBA#1 and LBA#4 are stored in the instruction queue of the Bank-C0 shown in FIG. 2, the read instructions corresponding to LBA#2 and LBA#6 are stored in the instruction queue of the Bank-C1, the read instructions corresponding to LBA#3 is stored in the instruction queue of the Bank-C2, and the read instructions corresponding to LBA#5 is stored in the instruction queue of the Bank-C3.

In this embodiment, the read instructions (corresponding to LBA#0, LBA#2, LBA#3, LBA#5) set at the tops of the instruction queues of the Bank-C0 to Bank-C3 are sequentially fetched, and are simultaneously inputted into the banks #0 to #3 in the NAND memory 2, respectively. In the case shown in FIG. 15, the read instructions are sequentially inputted into the four banks in a data transfer order (the bank #0→the bank #1→the bank #2→the bank #3) in accordance with the LBA addresses. However, because the time difference between each two neighboring instruction phases is very small, the read instructions may be inputted into the banks in a predetermined order irrespective of the data transfer order.

In this case, because the first transfer bank specification which the arbitrator 25 receives from the transfer order manager 60 is the bank #0, the arbitrator 25 judges whether or not the bank #0 is released from busy, once the read instructions are inputted into the four banks. If the bank #0 is released from busy, the arbitrator 25 causes the data pieces corresponding to the LBA#0 to be transferred from the bank #0, and outputs the transfer completion notice to the automatic transfer manager 40. Immediately after this data transfer is performed, the arbitrator 25 judges whether or not the Bank-C0 has an instruction which has not been executed yet. In this case, because the Bank-C0 has an instruction which has not been executed yet, the arbitrator 25 fetches the next read instruction (corresponding to LBA#1), and inputs this instruction into the bank #0 in the NAND memory 2. Because the transfer bank specification received from the transfer order manager 60 is the bank #0 again, the arbitrator 25 judges whether or not the bank #0 is released from busy. If the bank #0 is released from busy, the arbitrator 25 causes the data pieces corresponding to the LBA#1 to be transferred from the bank #0, and outputs the transfer completion notice to the automatic transfer manager 40. Immediately after this transfer of data corresponding to the LBA#1 is performed, the arbitrator 25 judges whether or not the Bank-C0 has an instruction which has not been executed yet. In this case, because the Bank-C0 has an instruction which has not been executed yet, the arbitrator 25 fetches the next read instruction (corresponding to LBA#4), and inputs this instruction into the bank #0 in the NAND memory 2.

The next transfer bank specification received from the transfer order manager 60 is the bank #1. Thus, the arbitrator 25 judges whether or not the bank #1 is released from busy. If the bank #1 is released from busy, the arbitrator 25 causes the data pieces corresponding to the LBA#2 to be transferred from the bank #1, and outputs the transfer completion notice to the automatic transfer manager 40. Immediately after this data transfer is performed, the arbitrator 25 judges whether or not the Bank-C1 has an instruction which has not been executed yet. In this case, because the Bank-C1 has an instruction which has not been executed yet, the arbitrator 25 fetches the next read instruction (corresponding to LBA#6), and inputs this instruction into the bank #1 in the NAND memory 2.

The next transfer bank specification received from the transfer order manager 60 is the bank #2. Thus, the arbitrator 25 judges whether or not the bank #2 is released from busy. If the bank #2 is released from busy, the arbitrator 25 causes the data pieces corresponding to the LBA#3 to be transferred from the bank #3, and outputs the transfer completion notice to the automatic transfer manager 40. Immediately after this data transfer is performed, the arbitrator 25 judges whether or not the Bank-C2 has an instruction which has not been executed yet. In this case, because the Bank-C2 has no instruction which has not been executed yet, the arbitrator 25 fetches no read instruction from the Bank-C2.

The next transfer bank specification received from the transfer order manager 60 is the bank #0. Thus, the arbitrator 25 judges whether or not the bank #0 is released from busy. If the bank #0 is released from busy, the arbitrator 25 causes the data pieces corresponding to the LBA#4 to be transferred from the bank #0, and outputs the transfer completion notice to the automatic transfer manager 40. Immediately after this data transfer is performed, the arbitrator 25 judges whether or not the Bank-C0 has an instruction which has not been executed yet. In this case, because the Bank-C0 has no instruction which has not been executed yet, the arbitrator 25 fetches no read instruction from the Bank-C0.

The next transfer bank specification received from the transfer order manager 60 is the bank #3. Thus, the arbitrator 25 judges whether or not the bank #3 is released from busy. If the bank #3 is released from busy, the arbitrator 25 causes the data pieces corresponding to the LBA#5 to be transferred from the bank #3, and outputs the transfer completion notice to the automatic transfer manager 40. Immediately after this data transfer is performed, the arbitrator 25 judges whether or not the Bank-C3 has an instruction which has not been executed yet. In this case, because the Bank-C3 has no instruction which has not been executed yet, the arbitrator 25 fetches no read instruction from the Bank-C3.

The next transfer bank specification received from the transfer order manager 60 is the bank #1. Thus, the arbitrator 25 judges whether or not the bank #1 is released from busy. If the bank #1 is released from busy, the arbitrator 25 causes the data pieces corresponding to the LBA#6 to be transferred from the bank #1, and outputs the transfer completion notice to the automatic transfer manager 40. Immediately after this data transfer is performed, the arbitrator 25 judges whether or not the Bank-C1 has an instruction which has not been executed yet. In this case, because the Bank-C1 has no instruction which has not been executed yet, the arbitrator 25 fetches no read instruction from the Bank-C1.

In the method of the embodiment shown in FIG. 15, the data transfer is performed in the order of the LBA logical addresses. For this reason, in FIG. 15, the data piece corresponding to LBA#1 starts to be transferred from the bank #0 at time t1 which is same as that in FIG. 14. Accordingly, the waiting time Td which occurs in the case of FIG. 14 does not exist in this method. As described above, because the data transfer from the NAND memory 2 to the RAM 3 is performed in the order of the LBA logical addresses, the method of the embodiment suppresses overhead which is incurred from the process performed on the other banks, and enhances the data transfer efficiency particularly in the case of the random reading, as well as makes it no longer necessary to secure a larger memory area in the RAM 3 for the rearrangement.

As described above, the embodiment employs the logical-physical conversion method in which the relationship between the logical addresses and the physical addresses is dynamically established while the data is written. This makes the memory locations of the data on the NAND memory 2 likely to be scattered. For this reason, the reading of the data from the NAND memory 2 is likely to be achieved by the random reading in which the data pieces are read from the scattered memory locations on the one-by-one basis. In random reading, since the method of the embodiment inhibits the overhead which is incurred from the process performed on the other banks, the data transfer performance is better than the method of the comparative example shown in FIG. 14.

As described above, the first embodiment is achieved as follows. First, the read instruction sequences are created by expanding the read commands in a way that the read instructions each have a size equal to or smaller than the unit size readable by the NAND controller, and are arranged in the order of the logical addresses specified by the read command, in accordance with the memory locations of the data pieces specified by the read command. Second, the read instruction sequences for the respective banks are created by expanding the created read instruction sequences to the read instruction sequences for the respective banks in accordance with the memory locations of the data piece on the multiple banks, the memory locations specified by the read instructions. Then, the read instruction sequences for the respective banks are outputted to the NAND controller. Third, the transfer order information indicating the order of the transfer from the banks in accordance with the order of the logical addresses specified by the read commands is created on the basis of the read instruction sequences in accordance with the order of the logical addresses and the memory locations of the data pieces on the multiple banks, the memory locations specified by the read instructions. Fourth, the read-out is performed from the multiple banks in accordance with the created transfer order information by controlling the NAND controller in accordance with the created transfer order information. This achievement enhances the transfer efficiency in the case of the data reading, and increases the transfer speed particularly in random reading, without securing a larger memory area for the rearrangement.

The banks are the target of the switching control in the foregoing case. It should be noted, however, that as long as multiple storage areas are commonly connected to the same bus and are operable independently of one another, the target of the controlled switching is not limited to the banks, and arbitrary groups of memory cells may be chosen as the target of the switch control to which the embodiment is applied. Furthermore, the method of the embodiment makes the RAM 3 for the data rearrangement no longer necessary, and accordingly may eliminate the existence of the RAM as the intermediate buffer for the data reading.

Second Embodiment

Figure 16:
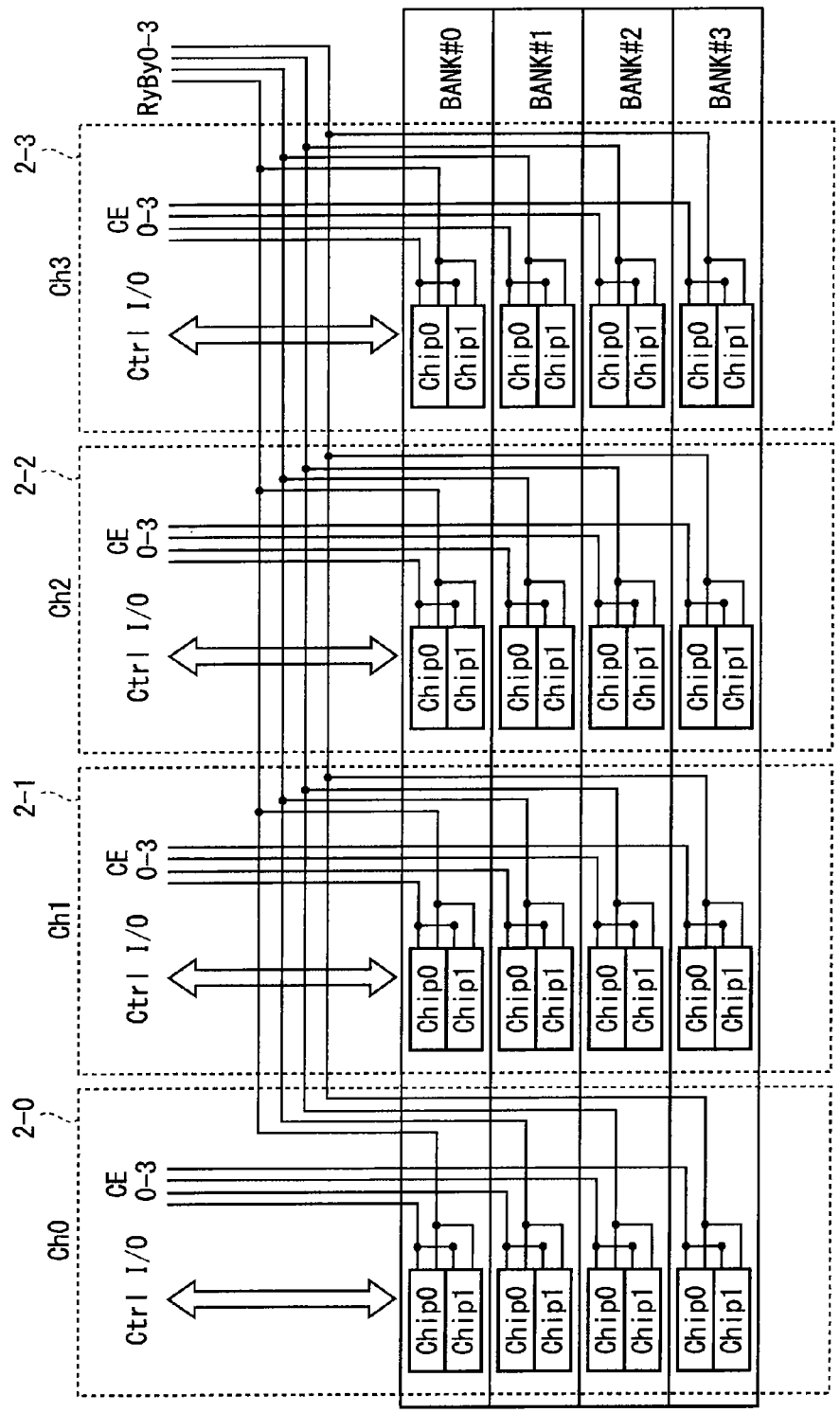
FIG. 16 is a diagram showing a configuration of the NAND memory.

FIG. 16 shows an example of a configuration of a NAND memory 2 which is applied to a memory system of a second embodiment. In the second embodiment, the NAND memory 2 includes multiple channel parallel operation elements 2-0 to 2-3. The channel parallel operation elements 2-0 to 2-3 are connected to a NAND controller 20 via multiple channels ch0 to ch3, respectively. Each of the channels ch0 to ch3 includes a control I/O signal line and chip enable signal lines CE0 to CE3. Each of the channel parallel operation elements 2-0 to 2-3 includes multiple banks (four banks, namely Bank#0 to Bank#3, in FIG. 16). Each bank in each of the channel parallel operation elements 2-0 to 2-3 includes multiple memory chips (two memory chips, namely chip0 and chip 1, in FIG. 16).

In FIG. 16, each bank covers the multiple channels. The banks are writable, readable and erasable independently of one another. One ready/busy signal (RyBy) is shared within one bank. Thus, control is made in a way that makes each set of memory chips, which share the same ready/busy signal (RyBy) across the channels, operate at the same time. The read control described with regard to the first embodiment may be applied to the NAND memory of this kind including the multiple channels.

Third Embodiment

Figure 17:
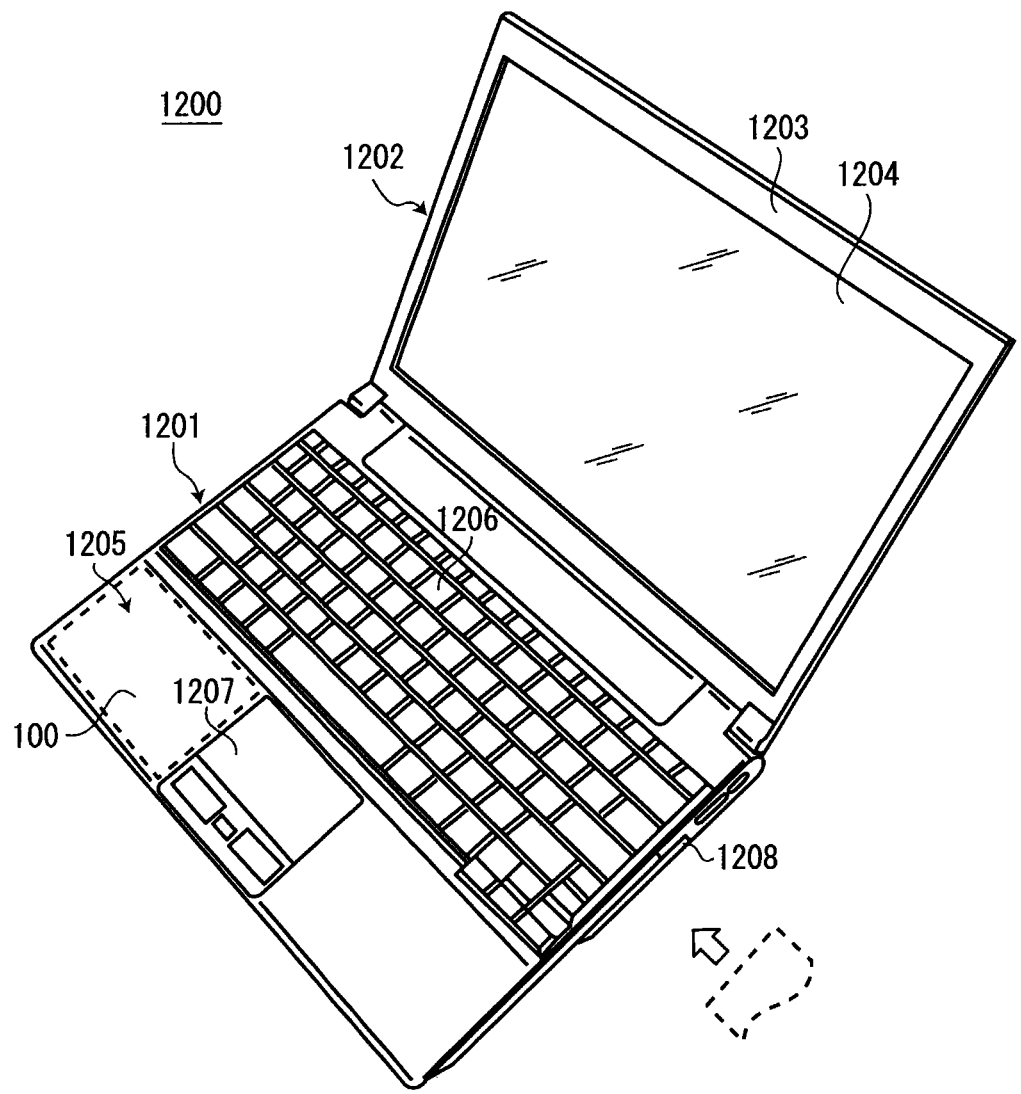
FIG. 17 is a perspective view showing an external appearance of a personal computer.

FIG. 17 is a perspective view showing an example of a personal computer 1200 in which the SSD 200 is mounted. The personal computer 1200 includes a main body 1201 and a display unit 1202. The display unit 1202 includes a display housing 1203 and a display device 1204 housed in the display housing 1203.

The main body 1201 includes a housing 1205, a keyboard 1206, and a touch pad 1207 which is a pointing device. A main circuit board, an Optical Disk Device (ODD) unit, a card slot, an SDD 100, and the like are housed inside the housing 1205.

The card slot is provided adjacent to the peripheral wall of the housing 1205. The peripheral wall is provided with an opening 1208 which is opposed to the card slot. The user can insert and pull an additional device into and out of the card slot through the opening 1208 from the outside of the housing 1205.

The SDD 100 may be used while being installed in the personal computer 1200 in lieu of the conventional HDD. Otherwise, the SDD 100 may be used as an additional device while being inserted in the card slot provided in the personal computer 1200.

Figure 18:
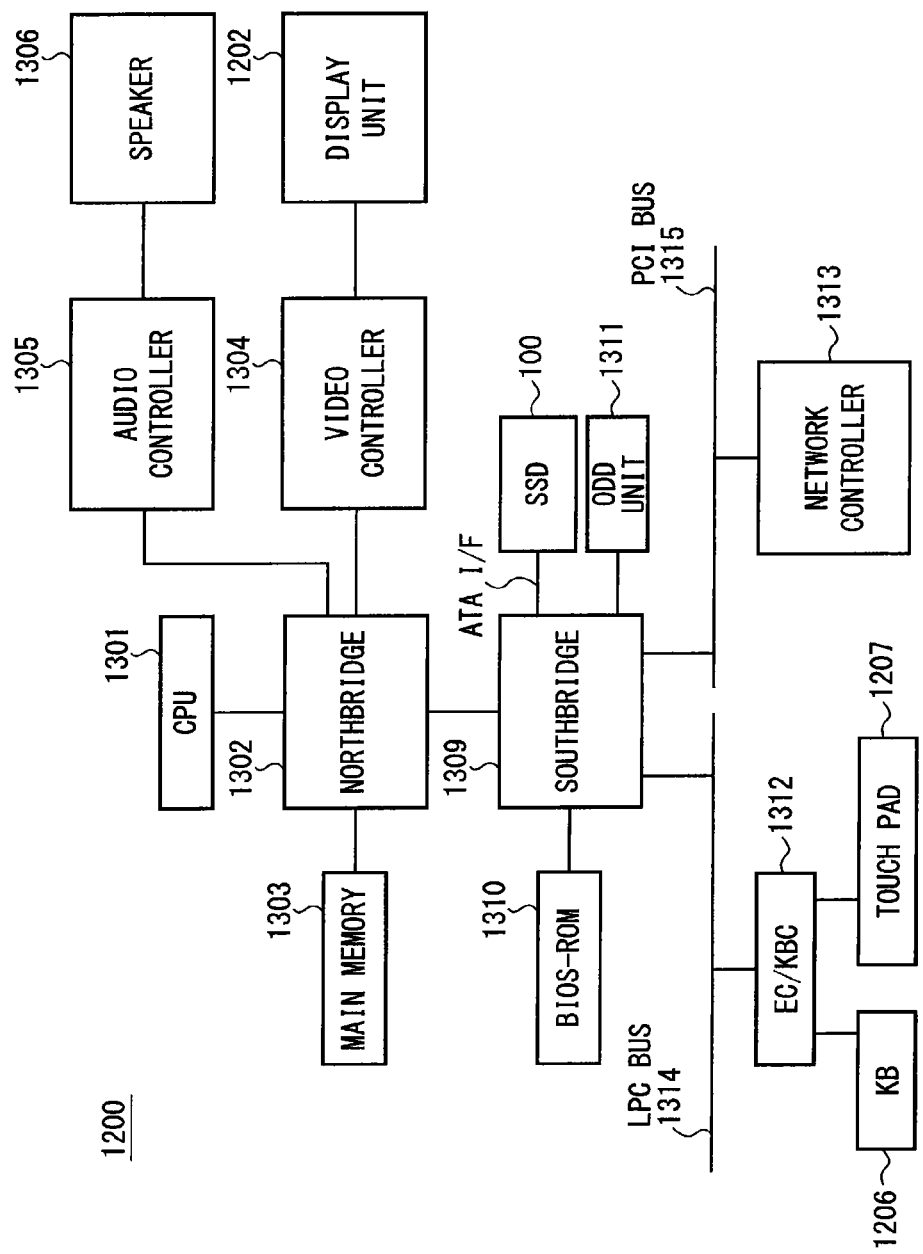
FIG. 18 is a diagram showing an example of a functional configuration of the personal computer.

FIG. 18 shows a system configuration example of a personal computer in which a SSD is mounted. The personal computer 1200 includes a CPU 1301, a northbridge 1302, a main memory 1303, a video controller 1304, an audio controller 1305, a southbridge 1309, a BIOS-ROM 1310, the SSD 100, an ODD unit 1311, an embedded controller/keyboard controller IC (EC/KBC) 1312, a network controller 1313, and the like.

The CPU 1301 is a processor provided to control the operation of the personal computer 1200, and executes an operating system (OS) which is loaded from the SSD 100 into the main memory 1303. In addition, in a case where the ODD unit 1311 enables at least one of a process of reading from and a process of writing to an installed optical disc, the CPU 1301 executes the process.

Furthermore, the CPU 1301 executes a system basic input output system (BIOS) stored in the BIOS-ROM 1310 as well. Incidentally, the system BIOS is a program for controlling the hardware in the personal computer 1200.

The northbridge 1302 is a bridge device for connecting a local bus of the CPU 1301 and the southbridge 1309 together.

A memory controller for controlling the access to the main memory 1303 is also included in the northbridge 1302.

Moreover, the northbridge 1302 has a function of making communications with the video controller 1304 and the audio controller 1305 via an accelerated graphics port (AGP) bus 1314 and the like as well.

The main memory 1303 functions as a work area for the CPU 1301 by temporarily storing programs and data. The main memory 1301 is formed from a RAM, for example.

The video controller 1304 is a video reproduction controller for controlling the display unit 1202 which is used as a display monitor of the personal computer 1200.

The audio controller 1305 is an audio reproduction controller for controlling a speaker 1306 of the personal computer 1200.

The southbridge 1309 controls the devices on a low pin count (LPC) and the devices on a peripheral component interconnect (PCI) bus 1315. In addition, the southbridge 1309 controls the SSD 100, which is the storage device for storing various sets of software and various sets of data, through an ATA interface.

The personal computer 1200 accesses the SSD 100 on sector basis. Write commands, read commands, cache flush commands and the like are inputted into the SSD 100 via the ATA interface.

In addition, the southbridge 1309 has a function of controlling the access to the BIOS-ROM 1310 and the access to the ODD unit 1311 as well.

The EC/KBC 1312 is a one-chip microcomputer in which an embedded controller for managing the electric power and a keyboard controller for controlling the keyboard (KB) 1206 and the touch pad 1207 are integrated.

The EC/KBC 1312 has a function of turning on and off the power supply of the personal computer 1200 depending on the user's manipulation of a power button. The network controller 1313 is a communication device for making communications with an external network, such as the Internet.

Although the multiple embodiments of the invention have been described, these embodiments are presented as instances of the invention. The embodiments are not intended to limit the scope of the invention. These novel embodiments can be carried out in various different modes. Various omissions, replacements and modification can be made within the scope not departing from the gist of the invention. These embodiments and their modifications are included not only in the scope and gist of the invention, but also in the inventions as recited in the scope of claims and the scope of their equivalents.

What is claimed is:

1. A memory system comprising:
   a plurality of nonvolatile memory banks commonly coupled to a data input/output line, and capable of performing an interleaving operation, a data cache and a memory cell array disposed inside each of the plurality of nonvolatile memory banks, data being read out from the memory cell array by a page unit and then stored in the data cache;
   a first controller configured to generate a plurality of page read commands by dividing a read request by the page unit, and to allocate the plurality of page read commands, in accordance with bank addresses specified by the page read commands, to a plurality of read queues provided respectively for the plurality of nonvolatile memory banks;
   a second controller including a plurality of bank controllers respectively coupled with the plurality of read queues, each of the plurality of bank controllers configured to issue the page read commands to the corresponding nonvolatile memory bank in parallel, regardless of an order of logical addresses specified by the page read request; and
   a third controller configured to control the second controller so that data stored in the data caches of the plurality of nonvolatile memory banks are sequentially transferred to outside the memory system through the data input/output line in accordance with the order of logical addresses specified by the read request, wherein
   the data cache is used for separating the data transfer stage from the data reading stage, thereby a data reading operation is performed in parallel among the plurality of nonvolatile memory banks and a data transferring operation from the plurality of nonvolatile memory banks to outside the memory system is performed, without using another memory component, in accordance with the order of logical addresses specified by the read request.

2. The memory system as recited in claim 1, wherein the issuances of the page read commands to the nonvolatile memory banks are performed in parallel irrespective of the logical addresses.

3. The memory system recited in claim 1,
   further comprising a random access memory (RAM) capable of storing data temporarily,
   wherein the data read out from the data cache are transferred to a host via the RAM.

4. The memory system recited in claim 1,
   further comprising a random access memory (RAM) capable of storing data temporarily,
   wherein the data read out from the data cache are transferred to a host without being transferred through the RAM.

5. The memory system as recited in claim 1,
   further comprising a processor configured to manage an address conversion table for converting the logical addresses into physical addresses of the nonvolatile memory banks, the physical addresses including the bank addresses,
   wherein, the first controller allocates the page read commands by referring to the address conversion table.

6. The memory system as recited in claim 1, wherein the plurality of bank controllers is configured to manage ready/busy signals for indicating operational states of the plurality of nonvolatile memory banks, respectively.

7. The memory system as recited in claim 1, wherein the second controller includes an error correction circuit configured to correct errors in data read out from the plurality of nonvolatile memory banks.

8. The memory system as recited in claim 1, wherein a time needed for a read process is shorter than a time needed for a write process in the nonvolatile memory banks.

9. The memory system as recited in claim 1, wherein the nonvolatile memory bank is a NAND flash memory chip.

10. The memory system as recited in claim 1, wherein the memory system is a solid state drive (SSD).

11. A method of controlling a memory system, comprising:
    receiving a data read request specifying logical addresses;
    parsing the data read request to a plurality of page read commands each specifying a bank address and associated with at least one logical address extracted from the logical addresses;
    issuing the plurality of page read commands to a plurality of interleaved nonvolatile memory banks in accordance with the bank addresses, irrespective of an order of the logical address specified in the data read request;

reading data in parallel among the plurality of interleaved nonvolatile memory banks, data read out from a memory cell array being stored in a data cache inside each of the plurality of interleaved nonvolatile memory banks; and sequentially transferring data to outside the memory system from the data caches of the plurality of nonvolatile memory banks, in accordance with the order of logical addresses specified by the read request, wherein the data cache is used for separating a data transfer stage from data reading storage, thereby a data reading operation is performed in parallel among the plurality of nonvolatile memory banks and a data transferring operation from the plurality of nonvolatile memory banks to outside the memory system is performed, without using another memory component, in accordance with the order of logical addresses specified by the read request.

12. The method as recited in claim 11, further comprising translating the logical addresses to physical addresses of the nonvolatile memory banks, the physical addresses including the bank addresses.

13. The method as recited in claim 11, wherein if data corresponding to a subsequent logical address is read out to the data cache in advance in a first nonvolatile memory bank, such data is not transferred until data corresponding to prior logical address is transferred first from a second nonvolatile memory bank.

14. The method as recited in claim 11, further comprising outputting a busy signal from the nonvolatile memory bank while data reading is performed inside the nonvolatile memory bank.

15. The method as recited in claim 12, wherein the page read command includes 00h-physical address-30h command sequence.

16. The method as recited in claim 14, wherein a period in which the busy signal is asserted, is different from each of the plurality of nonvolatile memory banks.

17. The method as recited in claim 11, wherein the plurality of nonvolatile memory banks share an internal I/O bus in the memory system.

18. The method as recited in claim 11, wherein the nonvolatile memory bank is a NAND type flash memory.

19. The method as recited in claim 11, wherein the data cache has a capacity that can store data simultaneously read out from the memory cell array in response to the page read command.

20. The method as recited in claim 11, wherein the transferring includes outputting data without passing through a buffer memory other than the data cache.

* * * * *